(12) United States Patent
Macaluso et al.

(10) Patent No.: US 11,077,822 B2
(45) Date of Patent: Aug. 3, 2021

(54) SUPPLEMENTAL RESTRAINT HARNESS

(71) Applicant: SMARTRIDR AG, Boppelsen (CH)

(72) Inventors: Andreas Macaluso, Horgen (CH);
Daniel Schläepfer, Boppelsen (CH)

(73) Assignee: Smartridr AG, Boppelsen (CH)

(*) Notice: Subject to any disclaimer, the term of this patent is extended or adjusted under 35 U.S.C. 154(b) by 82 days.

(21) Appl. No.: 16/348,261

(22) PCT Filed: Dec. 5, 2017

(86) PCT No.: PCT/IB2017/057648
§ 371 (c)(1),
(2) Date: May 8, 2019

(87) PCT Pub. No.: WO2018/104858
PCT Pub. Date: Jun. 14, 2018

(65) Prior Publication Data
US 2019/0315307 A1    Oct. 17, 2019

(30) Foreign Application Priority Data
Dec. 6, 2016   (CH) ...................... 01598/16

(51) Int. Cl.
*B60R 22/00* (2006.01)
*B60R 22/10* (2006.01)
*B60R 22/14* (2006.01)

(52) U.S. Cl.
CPC .......... *B60R 22/001* (2013.01); *B60R 22/105* (2013.01); *B60R 22/14* (2013.01)

(58) Field of Classification Search
CPC ..... B60R 22/001; B60R 22/105; B60R 22/12; B60R 22/14
See application file for complete search history.

(56) References Cited

U.S. PATENT DOCUMENTS 4,226,474 A   10/1980  Rupert et al.
4,720,064 A *  1/1988  Herndon ............... B64D 25/06
                                                244/122 AG
(Continued)

FOREIGN PATENT DOCUMENTS

DE      4401702 A1 *  8/1994   ........... B60R 22/105
EP      1138560 A1 * 10/2001   ........... B60R 22/105
(Continued)

OTHER PUBLICATIONS

International Search Report and Written Opinion for PCT/IB2017/057648, dated Feb. 27, 2018, 6 pages.

*Primary Examiner* — Laura Freedman
(74) *Attorney, Agent, or Firm* — Blank Rome LLP

(57) ABSTRACT

According to the present invention there is provided a supplemental restraint harness for cooperating with a seat belt of a vehicle, the supplemental restraint harness comprising, an upper portion which is configured to be worn on the torso of a wearer, wherein the upper portion comprises a first strap which, when the harness is worn, extends along a front of the wearer's torso, over a first shoulder of the wearer, and along a back of the wearer's torso, and a second strap which, when the harness is worn, extends along a front of the wearer's torso, over a second shoulder of the wearer, and along a back of the wearer's torso; and a lower portion, comprising a third strap which can be arranged to form a first loop which can receive a first leg of the wearer, and a fourth strap which can be arranged to form a second loop which can receive a second leg of the wearer; and wherein the upper position and lower portion are connected to one another; and wherein the harness further comprises at least one connector which is suitable for connecting to a seat belt of a vehicle. There is further provided a seat belt assembly which comprises said supplemental restraint harness.

20 Claims, 19 Drawing Sheets

(56) References Cited

U.S. PATENT DOCUMENTS

| | | | |
|---|---|---|---|
| 4,840,144 A | | 6/1989 | Voorhees et al. |
| 4,923,147 A | * | 5/1990 | Adams ................. A42B 3/0473 244/122 AG |
| 4,938,436 A | * | 7/1990 | Bradley ................. B64D 25/06 244/122 AH |
| 5,080,191 A | | 1/1992 | Sanchez |
| 5,306,044 A | * | 4/1994 | Tucker .................... B60R 22/14 280/801.1 |
| 5,544,363 A | * | 8/1996 | McCue ................. A62B 35/04 2/102 |
| 5,660,445 A | * | 8/1997 | Murray ................. A61F 5/3776 297/485 |
| 5,733,004 A | | 3/1998 | Celestina-Krevh et al. |
| 6,467,851 B1 | * | 10/2002 | Mannell ............... A47D 13/086 119/770 |
| 6,871,360 B1 | | 3/2005 | Ashline |
| 6,931,669 B2 | * | 8/2005 | Ashline ................ A42B 3/0473 2/422 |
| 9,351,529 B1 | * | 5/2016 | Ashline ................... B60R 22/12 |
| 10,414,373 B2 | * | 9/2019 | Osei-Owusu ......... B60R 22/105 |
| 2002/0178492 A1 | | 12/2002 | Ashline |
| 2015/0069812 A1 | | 3/2015 | Kim |

FOREIGN PATENT DOCUMENTS

| | | | | |
|---|---|---|---|---|
| GB | 2406078 A | * | 3/2005 | ............ B60R 22/14 |
| JP | 2000328319 A | * | 11/2000 | |
| JP | 2001151074 A | * | 6/2001 | |
| JP | 2002030501 A | * | 1/2002 | |
| JP | 2002180307 A | * | 6/2002 | |
| JP | 2003170768 A | * | 6/2003 | |
| JP | 2003183914 A | * | 7/2003 | |

* cited by examiner

SUPPLEMENTAL RESTRAINT HARNESS

RELATED APPLICATIONS

This application is a national phase of PCT/IB2017/057648, filed on Dec. 5, 2017, which claims the benefit of Swiss Application No. CH01598/16, filed on Dec. 6, 2016. The entire contents of these applications are hereby incorporated by reference.

FIELD OF THE INVENTION

The present invention concerns a supplemental restraint harness for cooperating with a seat belt of a vehicle; in particular, the present invention concerns a supplemental restraint harness which has straps which are worn on the torso of the wearer, and respective straps which loop around a wearer's left and right legs.

DESCRIPTION OF RELATED ART

In the art there are many different types of seat belts, in vehicles such as planes, busses and automobiles, two-point seat belts and three point seat belts are the most common.

Three point seat belts are the typically the type of seat belts used in automobiles vehicles. In a three-point seat belt, when the buckle of the seat belt has been secured, the belt crosses diagonally over a wearer's torso, crossing the wearer's body at the sternum (this portion of the belt is referred to in the art as a "sash belt"), and crosses over the wearer's pelvic region or waist region (this portion of the belt is referred to in the art as a "lap belt"). Typically, three point seat belts in automobiles are configured to fit adults and since their adjustability is limited very often do not fit safely to a child. For example, when a child wears a standard three-point seat belt, typically, the strap which should cross diagonally over a wearer's torso will be positioned at the neck of the child, and not at the sternum, thus making the seat belt unsafe for the child to wear.

To address this problem child seats, or booster seats, are used. The booster seat is placed on the automobile seat, and then the child sits on the booster seat. The booster seat raises the position of the child so that when a child wears the three-point seat belt, the strap which crosses diagonally over a wearer's torso will be positioned at the sternum of the child and not at neck of the child, thus making the seat belt safer to ware. However child seats or booster seats are large and cumbersome and therefore are not convenient to carry; in other words existing child seats or booster seats are not designed to be portable.

Additionally, it has been found that in the case of collision, children are more likely to slip under the seat belt (i.e. slip under the strap which crosses over the wearer's stomach region); this is known in the art as 'submarining'. FIG. 7 illustrates 'submarining' of a child during a vehicle collision. 'Submarining' can be fatal, causing serious internal injury and in some cases even death. Neither standard seat belts nor existing booster seats provide any measure which will prevent children from 'submarining'.

Two-point seat belts are typically lap belts; lap belts cross over the wearer's stomach region or waist region. Lap belts are the typical type of seat belts which are used in planes, busses and sometimes in older cars, or other public transport. Lap belts can cause serious internal injury to a wearer during a collision since all of the retained applied by the lap belt is concentrated on the region of the stomach of the wearer. Additionally the problem 'submarining' also occurs.

It is an aim of the present invention to mitigate or obviate at least some of the disadvantages associated with existing child safety solutions in the art.

BRIEF SUMMARY OF THE INVENTION

According to the present invention there is provided a supplemental restraint harness for cooperating with a seat belt of a vehicle, the supplemental restraint harness comprising, an upper portion which is configured to be worn on the torso of a wearer, wherein the upper portion comprises a first strap which, when the harness is worn, extends along a front of the wearer's torso, over a first shoulder of the wearer, and along a back of the wearer's torso, and a second strap which, when the harness is worn, extends along a front of the wearer's torso, over a second shoulder of the wearer, and along a back of the wearer's torso; and a lower portion, comprising a third strap which can be arranged to form a first loop which can receive a first leg of the wearer, and a fourth strap which can be arranged to form a second loop which can receive a second leg of the wearer; and wherein the upper portion and lower portion are connected to one another; and wherein the harness further comprises at least one connector which is suitable for connecting to a seat belt of a vehicle.

The harness may comprise at least a first connector which is arranged so that it can be connected to a sash-belt when the harness is worn, and at least a second connector which is arranged so that it can be connected to a lap belt. It should be understood that a sash-belt is a seat belt, or part of a seat belt, which crosses the wearer's torso (e.g. crosses over the sternum of the wearer); and a lap belt is a seat belt, or part of a seat belt, which crosses over the wearer's stomach region or waist region.

The harness may comprise at least a first connector which is provided on the upper portion so that it can be connected to a sash belt, and wherein the harness further comprises at least a second connector which is provided on the lower portion so that it can connect to a lap belt.

The harness may comprise a first connector provided on the first strap so that the first connector can be connected to a sash belt, and a second connector provided on the second strap so that the second connector can be connected to a sash belt, a third connector provided on the third strap so that the third connector can connect to a lap belt, and a fourth connector provided on the fourth strap so that the fourth connector can connect to a lap belt.

The first strap may connect to the third strap at a first connection position and second connection position, and wherein the third connector is positioned between the first and second connection positions; and the second strap may connect to the fourth strap at a third connection position and fourth connection position, and wherein the fourth connector is positioned between the third and fourth connection positions.

In one embodiment, the first strap connects to the fourth strap at a fourth connection position and the fourth connector is positioned substantially opposite the fourth connection position, and wherein the second strap connects to the third strap at a second connection position and wherein the third connector is positioned substantially opposite the second connection position.

At least a part of the first strap may be connected to the third strap and at least a part of the second strap is connected to the fourth strap.

The harness may further comprise a garment which can be worn on the torso of a user, and wherein the harness further comprises an attachment means which attaches the first and second straps to the garment.

The attachment means may comprise one or more guide members which are fixed to the garment and which are configured to receive the first strap, and one or more guide members which are fixed to the garment and which are configured to receive the second strap.

The one or more guide members may comprise a strip which is fixed to the garment to form an arch.

The at least one connector may comprise a hook member which can be arranged to hook onto a seat belt so as to connect the harness to the seat belt.

The at least one connector may comprise a C-shaped portion which defines opposing hook members which can hook onto a seat belt so as to connect the harness to the seat belt.

The at least one connector may comprise an anchor member and a latch member, wherein the anchor member comprises a first end which is pivotally attached to the anchor member fixed and a second, free, end which has a connecting means which can connect with a connecting means on the anchor member; wherein the latch member is moveable between a first position wherein a seat belt can be received between the latch member and the anchor member, and a second position wherein the connecting means on latch member is connected to the connecting means on the anchor member, so that the seat belt is held in a channel defined between the latch member and anchor member.

The at least one connector may comprise a hook and loop fastener.

The least connector may comprise an aperture defined therein through which the first, second, third or fourth strap passes, so as to attach said at least one connector to said strap.

The third strap may comprise a first free end having a first connector, and a second free end having a second connector, and wherein the first and second connectors are configured such that they can be connected to one another, so that the third strap forms said first loop; and the fourth strap may comprise a first free end having a third connector, and a second free end having a fourth connector, and wherein the third and fourth connector are configured such that they can be connected to one another, so that the fourth strap forms said first loop.

In one embodiment at least one of the first and/or second connectors comprise a strap adjuster buckle, which can be used to adjust the effective length of the third strap, so that the diameter of the first loop can be adjusted; and wherein the at least one of the third and/or fourth connectors comprise a strap adjuster buckle, which can be used to adjust the effective length of the fourth strap, so that the diameter of the second loop can be adjusted.

The first strap may further comprise a strap adjuster buckle which can be used to adjust the effective length of the first strap. The second strap may further comprise a strap adjuster buckle which can be used to adjust the effective length of the second strap.

The harness may further comprise at least one belt which is connected to both the first and second straps, and wherein the belt is substantially perpendicular to the first and second straps.

The harness may comprise a belt which is connected to the first and second straps at a position such that when the harness is worn the belt is positioned at the sternum of the wearer.

The harness may comprise a belt which is connected to the first and second straps at a position such that when the harness is worn the belt is positioned at the upper back of the wearer.

The harness may comprise a belt which is connected to the first and second straps at a position such that when the harness is worn the belt is positioned at the lower back of the wearer.

The harness may comprise a belt which is connected to the first and second straps at a position such that when the harness is worn the belt can be arranged around the waist of the wearer.

In one embodiment, the first strap and second strap have at least a portion which is elastic.

According to a further aspect of the present invention there is provided an assembly comprising a seat belt, wherein the seat belt has been arranged to be buckled, and a harness according to any one of the above-mentioned supplemental restraint harnesses, wherein the at least one connector of said supplemental restraint harness is connected to the seat belt.

BRIEF DESCRIPTION OF THE DRAWINGS

The invention will be better understood with the aid of the description of embodiments, which are given by way of example only, and illustrated by the figures, in which:

FIG. 4b provides a back view of the supplemental restraint harness shown in FIG. 4a;

FIG. 11b provides a back view of the supplemental restraint harness shown in FIG. 11a;

DETAILED DESCRIPTION OF POSSIBLE EMBODIMENTS OF THE INVENTION

Figure 1:
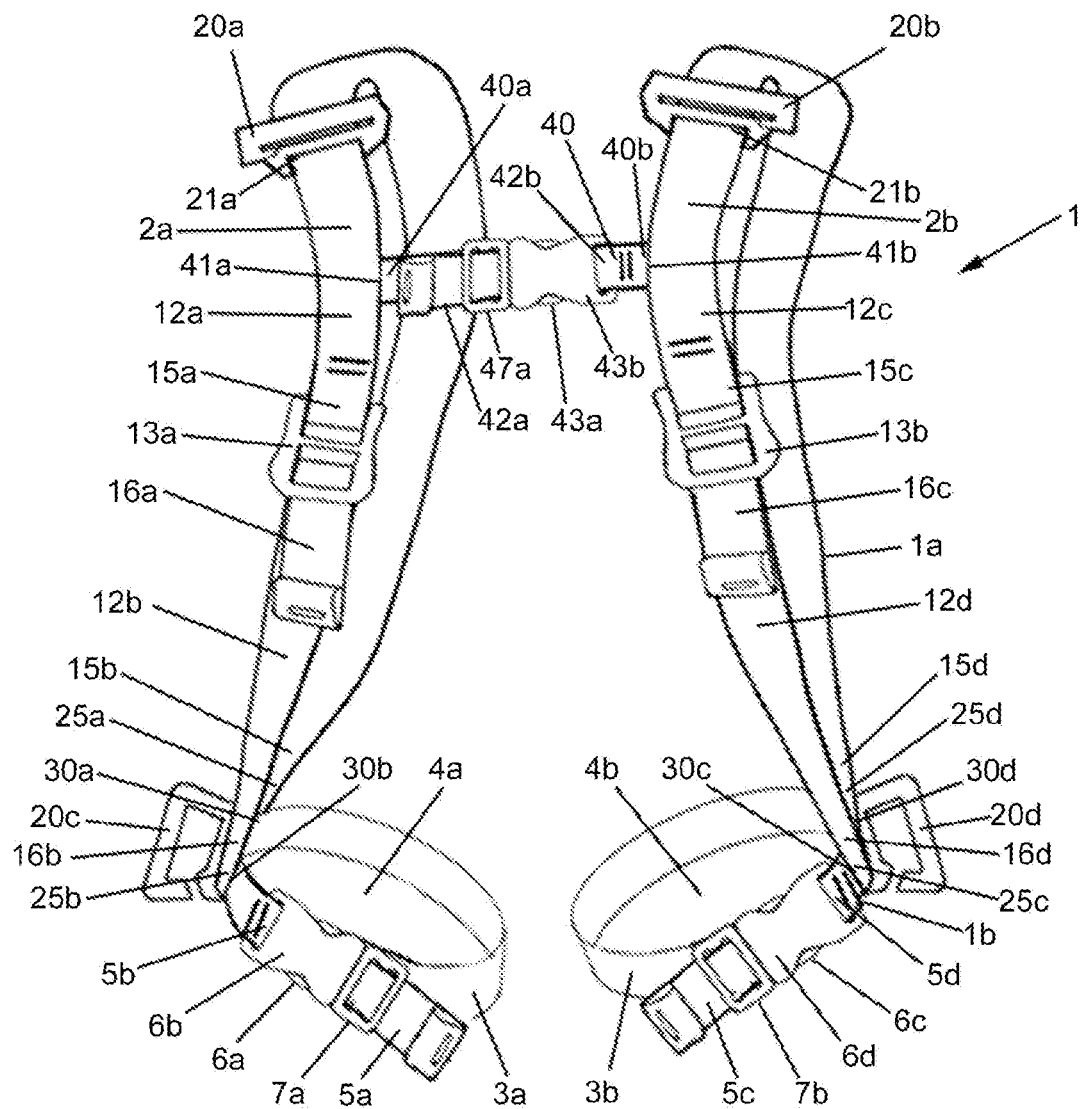
FIG. 1 provides a perspective view of a supplemental restraint harness according to an embodiment of the present invention.

FIG. 1 provides a perspective view of a supplemental restraint harness 1 according to an embodiment of the present invention.

The supplemental restraint harness 1 is suitable for cooperating with a restraint system of a vehicle, in particular is suitable for cooperating with a seat belt of a vehicle. The supplemental restraint harness 1 comprises, an upper portion 1a which is configured to be worn on the torso of a wearer and a lower portion 1b which is to be worn around the legs of a wearer.

The upper portion 1a comprises a first strap 2a and a second strap 2b. When the harness 1 is worn, the first strap 2a, extends along a front of the wearer's torso, over a first shoulder of the wearer, and along a back of the wearer's torso; the second strap 2b extends along a front of the wearer's torso, over a second shoulder of the wearer, and along a back of the wearer's torso.

The lower portion 1b comprises a third strap 3a and a fourth strap 3b. The third strap 3a can be arranged to form a first loop 4a which can receive a first leg of a wearer, and a fourth strap 3b can be arranged to form a second loop 4b which can receive a second leg of the wearer.

Specifically, third strap 3a comprises a first free end 5a having a first connector 6a, and a second free end 5b having a second connector 6b; in this example the first connector 6a is a male member 6a of a snap clip system, and the second connector is a female member 6b of a snap clip system. The first and second connectors 6a,6b can connect to one another so that the third strap 3a forms said first loop 4a; specifically, the male member 6a can snap fit to the female member 6b so that the third strap 3a forms the first loop 4a. The male member 6a further comprises a strap adjuster buckle 7a which can be used to adjust the effective length of the third strap 3a, so that the diameter of the first loop 4a can be adjusted to fit the diameter of the wearer's leg.

The fourth strap 3b comprises a first free end 5c having a first connector 6c, and a second free end 5d having a second connector 6d; in this example the first connector 6c is a male member 6c of a snap clip system, and the second connector is a female member 6d of a snap clip system. The first and second connectors 6c,6d can connect to one another so that the fourth strap 3b forms said second loop 4b; specifically, the male member 6c can snap fit to the female member 6d so that the fourth strap 3b forms the second loop 4b. The male member 6c further comprises a strap adjuster buckle 7b which can be used to adjust the effective length of the fourth strap 3d, so that the diameter of the second loop 4b can be adjusted to fit the diameter of the wearer's leg.

The upper portion 1a and lower portion 1b are connected to one another. It should be understood that the upper portion 1a may be connected to any part of the lower portion 1b using any suitable means of connection. In this example a first end 25a of the first strap 2a is connected to the third strap 3a at a first connection position 30a along the length of the third strap 3a, and a second, opposite, end 25b of the first strap 2a is connected to the third strap 3a at a second connection position 30b along the length of the third strap 3a; a first end 25c of the second strap 2b is connected to the fourth strap 3b at a third connection position 30c along the length of the fourth strap 3b, and a second, opposite, end 25d of the second strap 2b is connected to the fourth strap 3b at a fourth connection position 30d along the length of the fourth strap 3b.

In this example the first strap 2a is divided into two portions, a first portion 12a and second portion 12b, which are connected via a first strap adjuster buckle 13a. The first portion 12a has a first end 15a which is fixed to the first strap adjuster buckle 13a, and a second, opposite end 15b which is fixed to the third strap 3a at the first connection position 30a; the second portion 12b has a first end 16a which is woven through the strap adjuster buckle 13a, and a second, opposite, end 16b which is fixed to the third strap 3a at the second connection position 30b. As per the normal operation of strap adjuster buckles, the first end 16a of the second portion 12b can be pulled through the first strap adjuster buckle 13a so as to shorten the effective length of the first strap 2a, or can be pushed through the first strap adjuster buckle 13a so as to increase the effective length of the first strap 2a.

In this example the second strap 2b is divided into two portions, a first portion 12c and second portion 12d, which are connected via a second strap adjuster buckle 13b. The first portion 12c has a first end 15c which is fixed to the second adjuster buckle 13b, and a second, opposite, end 15d which is fixed to the fourth strap 3b at the fourth connection position 30d; the second portion 12d has a first end 16c which is woven through the second strap adjuster buckle 13b, and a second, opposite, end 16d which is fixed to the fourth strap 3b at the third connection position 30c. As per the normal operation of strap adjuster buckles, the first end 16c of the second portion 12d can be pulled through the second strap adjuster buckle 13b so as to shorten the effective length of the second strap 2b, or can be pushed through the second strap adjuster buckle 13b so as to increase the effective length of the second strap 2b.

However, even though in this example embodiment the first and second straps 2a,2b are shown as being divided into two portions, first and second portions 12a,12b, 12c,12d, connected via a respective strap adjuster buckle 13a,13b, it will be understood that it is not essential for the first and second straps 2a,2b be divided into two portions and it is not essential to have respective strap adjuster buckles 13a,13b. In another embodiment the first and second straps 2a,2b are each defined by respective single continuous straps (i.e. the first and second straps 2a,2b are not divided into two portions); the single strap which defines the first strap 2a has opposite ends which connect to the third strap 3a at the first and second connection positions 30a,b respectively, and, the single strap which defines the second strap 2b has opposite ends which connect to the fourth strap 3b at the third and fourth connection positions 30c,d respectively.

The supplemental restraint harness 1 further comprises at least one connector 20a-d which is suitable for connecting the harness 1 to a seat belt of a vehicle. In this example the supplemental restraint harness 1 comprises four connectors 20a-d, however it should be understood that one connector only is sufficient to achieve the advantages of the present invention. Any one of the connectors 20a-d can be connected to a seat belt (preferably all of the connectors 20a-d are connected to a seat belt); advantageously, when seat belt of a vehicle has been buckled and the supplemental restraint harness 1, worn by a wearer, is connected via at least one of the connectors 20a-d to the buckled seat belt, the harness 1 will serve to restrain the wearer during a vehicle collision both at the torso, via the first and second straps 2a,2b, and at the legs, via the third and fourth straps 3a,b; thus injury which would otherwise result from submarining will not occur. It should be understood that the wearer of the supplemental restraint harness 1 could either sit on the buckled seat belt so that the seat belt is located between the wearer and the seat; or alternatively the wearer could sit behind the buckled seat belt so that the wearer is located between the buckled seat belt and the seat; or in a further option, in the case the seat belt is a three point seat belt, the wearer of the harness 1 could sit behind the sash belt of the buckled seat belt and sit on the lap belt so that the lap belt is positioned behind the wears body but the sash belt is position in front of the wearers body.

In this example the supplemental restraint harness 1 comprises a first connector 20a which is provided on the first strap 2a, a second connector 20b which is provided on the second strap 2b, a third connector 20c which is provided on the third strap 3a, and a fourth connector 20d which is provided on the fourth strap 3b. Each of the connector 20a-d is configured such that it can cooperate with a seat belt to connect the harness 1 to the seat belt; each connector 20a-d may have any suitable configuration which will allow them to be connected to a seat belt; some exemplary configurations for any of the connectors 20a-d will be described below with respect to FIGS. 5a-c.

In this example the first connector 20a has an aperture 21a defined therein, through which the first strap 2a passes; the first strap 2a is free to move through the aperture 21a so as to allow the first connector 20a to be moved along the first strap 2a; in this manner the position of the first connector 20a along the first strap 2a can be adjusted. The second connector 20b has an aperture 21b defined therein, through which the second strap 2b passes; the second strap 2b is free to move through the aperture 21b so as to allow the second connector 20b to be moved along the second strap 2b; in this manner the position of the second connector 20b along the second strap 2b can be adjusted. Preferably, during use, the first and/or second connectors 20a,b are moved to positions along the length of the respective first and second straps 2a,2b so that they are positioned at the front of the wearer's torso, and are positioned below the level of the neck of the wearer; advantageously, the sash belt of a three point seat belt which has been buckled, can be connected to the first or second connector 20a,b which is below the level of the neck of the wearer, so that in the case of a vehicle collision the sash belt will not restrain the wearer of the harness at the neck which would result in injury. Typically, during use only one of the first or second connectors 20a,b will be connected to the sash belt; the first or second connector 20a,b which is to be connected to the sash belt is most preferably positioned along the respective first or second strap 2a,2b so that when the sash belt is connected to the first or second connector 20a,b the sash belt will cross the sternum (not the neck) of the wearer.

Typically, in a vehicle which has three point seat belts, the sash belt of a three-point seat belt in the vehicle will cross from right to left of the wearer, and the sash belt of another three-point seat belt in the vehicle will cross from left to right of the wearer. Advantageously, the first connector 20a can connect to a sash belt which crosses from right to left of the wearer (from the perspective of the wearer), and the second connector 20b can connect to a sash belt which crosses from left to right of the wearer (from the perspective of the wearer).

The third connector 20c is connected to the third strap 3a; it should be understood that the third connector 20c could be connected to the third strap 3a at any position along the length of the third strap 3a. Preferably, the third connector 20c is connected to the third strap 3a at a position along the length of the third strap 3a where it can be connected to a lap belt (e.g. to a lap belt seat belt, or to the lap belt of a three-point seat belt), which has been buckled. Most preferably the third connector 20c is connected to the third strap 3a at a position along the length of the third strap 3a where it can be connected to a lap belt (e.g. to a lap belt seat belt, or to the lap belt of a three-point seat belt), which has been buckled and which is positioned behind the wearer of the harness (in other words when the lap belt of the buckled seat belt is between the wearer of the harness and the seat of the vehicle). In this example the third connector 20c is connected to the third strap 3a at a position between the first connection position 30a and the second connection position 30b.

The fourth connector 20d is connected to the fourth strap 3b; it should be understood that the fourth connector 20d could be connected to the fourth strap 3b at any position along the length of the fourth strap 3b. Preferably, the fourth connector 20d is connected to the fourth strap 3b at a position along the length of the fourth strap 3b where it can be connected to a lap belt (e.g. to a lap belt seat belt, or to the lap belt of a three-point seat belt) which has been buckled. Most preferably the fourth connector 20d is connected to the fourth strap 3b at a position along the length of the fourth strap 3b where it can be connected to a lap belt (e.g. to a lap belt seat belt, or to the lap belt of a three-point seat belt) which has been buckled and which is positioned behind the wearer of the harness (in other words when the lap belt of the buckled seat belt is between the wearer of the harness and the seat of the vehicle). In this example the fourth connector 20d is connected to the fourth strap 3b at a position between the third connection position 30c and the fourth connection position 30d.

It should be understood that the third and fourth connectors 20c,d may to be attached to the third and fourth straps 3a,b respectively in a manner such that they have a fixed position along the length of the respective third and fourth straps 3a,b i.e. so that the third and fourth connectors 20c,d cannot be moved with respect to the third and fourth straps 3a,b. However in another embodiment the third and fourth connectors 20c,d may have apertures defined therein (similar to apertures 21a,21b defined in the first and second connectors 20a,b) though which the respective third and fourth straps 3a,b pass so that the third and fourth connectors 20c,d may be moved along the length of the respective third and fourth straps 3a,b.

Advantageously, the third and fourth connectors 20c,d enable the supplemental restraint harness 1 of the present invention to be used in some vehicles (such as aeroplanes and busses) which have only lap belt seat belts. The third and fourth connectors 20c,d can also be used with other seat belts, such as a three point seat belt, in conjunction with the first and second connectors 20a,b, to provide improved restraint of the wearer, whereby the first or second connector 20a,b connects to the sash belt of a buckled three point seat belt, and the third and/or fourth connectors 20c,d connect to the lap belt of the buckled three point seat belt.

The supplemental restraint harness 1 shows in FIG. 1 further comprises a chest belt 40 which connects the first and second straps 2a,b. The chest belt 40 is connected to the first and second straps 2a,b such that it is orientated substantially perpendicular to the first and second straps 2a,b. The chest belt 40 is connected at positions along the respective first and second straps 2a,b such that when the harness 1 is worn, the chest belt 40 is located at the sternum of the wearer. In this example the chest belt is divided into two portions 40a,b, namely a first portion 40a and a second portion 40b.

The first portion 40a has a first end 41a which is fixed to the first strap 2a, and a second opposite end 42a which is a free end 42a. The first portion 40a further comprises a first connector 43a; in this example the first connector 43a is a male member 43a of a snap clip system. The first connector 43a further comprises a strap adjuster buckle 47a; the free end 42a of the first portion 40a is woven through the strap adjuster buckle 47a. As per the normal operation of strap adjuster buckles, the free end 42a of the second portion can be pulled through the strap adjuster buckle 47a so as to shorten the effective length of the first portion 40a thus decreasing the effective length of the chest strap 40, or, can be pushed through the strap adjuster buckle 47a so as to increase the effective length of the first portion 40a thus increasing the effective length of the chest strap 40.

The second portion 40b has a first end 41b which is fixed to the second strap 2b, and a second opposite end 42b which is a free end 42b. The second portion 40b further comprises a second connector 43b; in this example the second connector 43b is a female member 43b of a snap clip system. The first and second connectors 43a,43b can connect to one another to connect first and second portions 40a,40b; specifically, the male member 43a can snap fit to the female member 43b so as to connect the first and second portions 40a,40b.

It should be understood that the chest belt 40 is not an essential feature of the present invention and that the first and second straps 2a,b could be connected using any other suitable means; for example in another embodiment the first and second straps 2a,b are connected via a garment to which the first and second straps 2a,b are connected. In another embodiment the first and second straps 2a,b are connected by a belt which is configured to be positioned at the lower back of a wearer when the harness is worn, and/or by a belt which is configured to be positioned at the upper back of a wearer when the harness is worn, and/or by a belt which is configured to be positioned at the stomach of a wearer when the harness is worn, and/or by a belt which is configured to be worn around the waist of a wearer when the harness is worn. In yet a further embodiment the first and second straps 2a,b are not connected at all.

Figure 2:
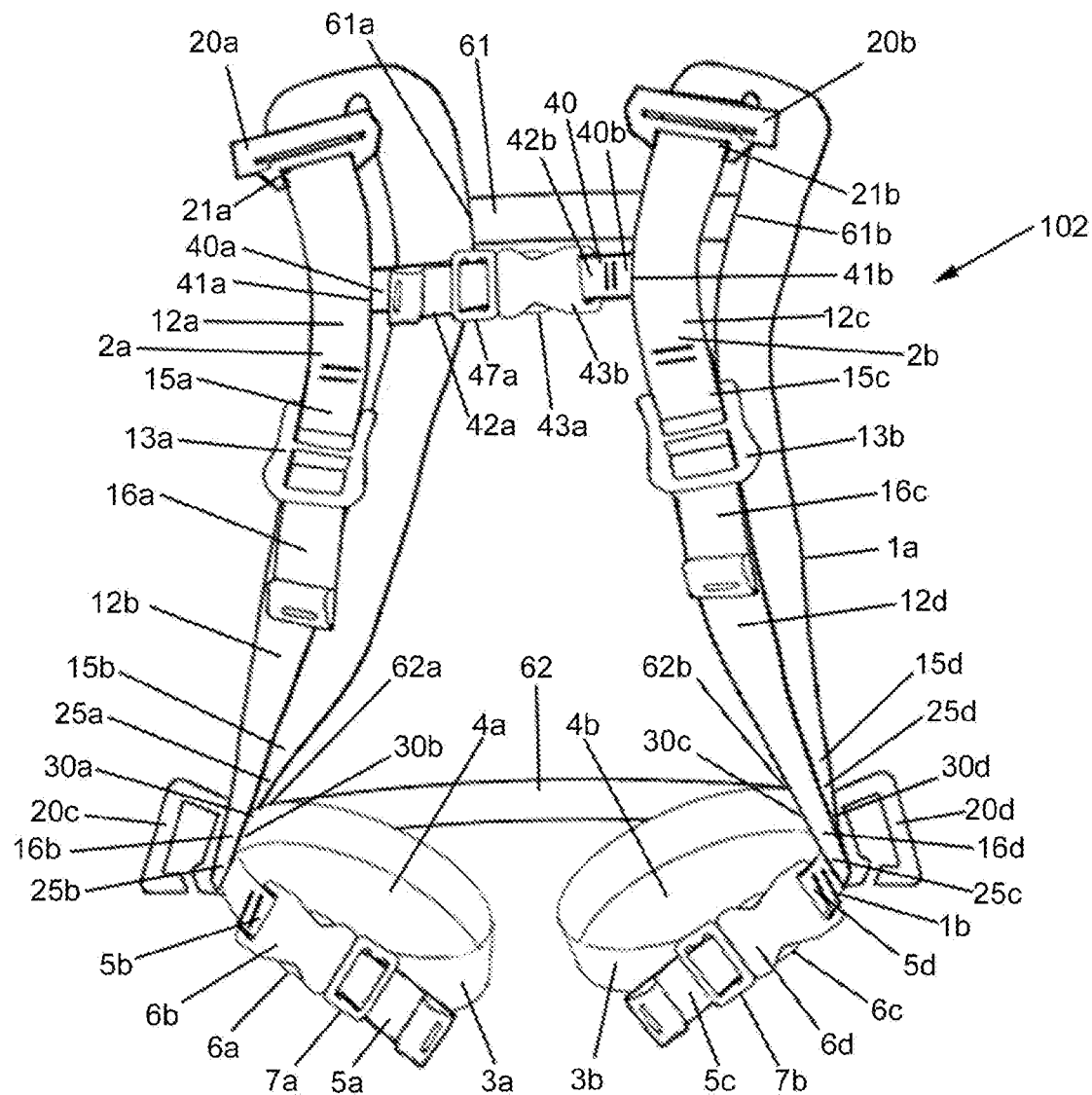
FIG. 2 provides a perspective view of a supplemental restraint harness according to a further embodiment of the present invention.

FIG. 2 is a perspective view of a supplemental restraint harness 102 according to a further embodiment of the present invention. The supplemental restraint harness 102 shown in FIG. 2 has many of the same features as the supplemental restraint harness 1 shown in FIG. 1 and like features are awarded the same reference numbers.

The supplemental restraint harness 102 further comprises a upper-back belt 61 which has opposite ends 61a,61b which connect to the first and second straps 2a,b respectively. The upper-back belt 61 is connected to the first and second straps 2a,b such that it is orientated substantially perpendicular to the first and second straps 2a,b. The upper-back belt 61 is connected at positions along the first and second straps 2a,b such that when the harness 102 is worn, the upper-back belt 61 is located at the upper back of the wearer (preferably, the back belt 61 crosses the shoulder blades of the wearer).

The supplemental restraint harness 102 further comprises a lower-back belt 62 which has opposite ends 62a,62b which connect to the first and second straps 2a,b respectively. The lower-back belt 62 is connected to the first and second straps 2a,b such that it is orientated substantially perpendicular to the first and second straps 2a,b. The lower-back belt 62 is connected at positions along the first and second straps 2a,b such that when the harness 102 is worn, the lower-back belt 62 is located at the lower back of the wearer.

It should be understood that the upper-back belt 61 and lower-back belt 62 are optional features; any of the embodiments described herein may be without an upper-back belt 61 and lower-back belt 62, or may have both the upper-back belt 61 and lower-back belt 62, or may have only one of the upper-back belt 61 or lower-back belt 62.

Figure 3:
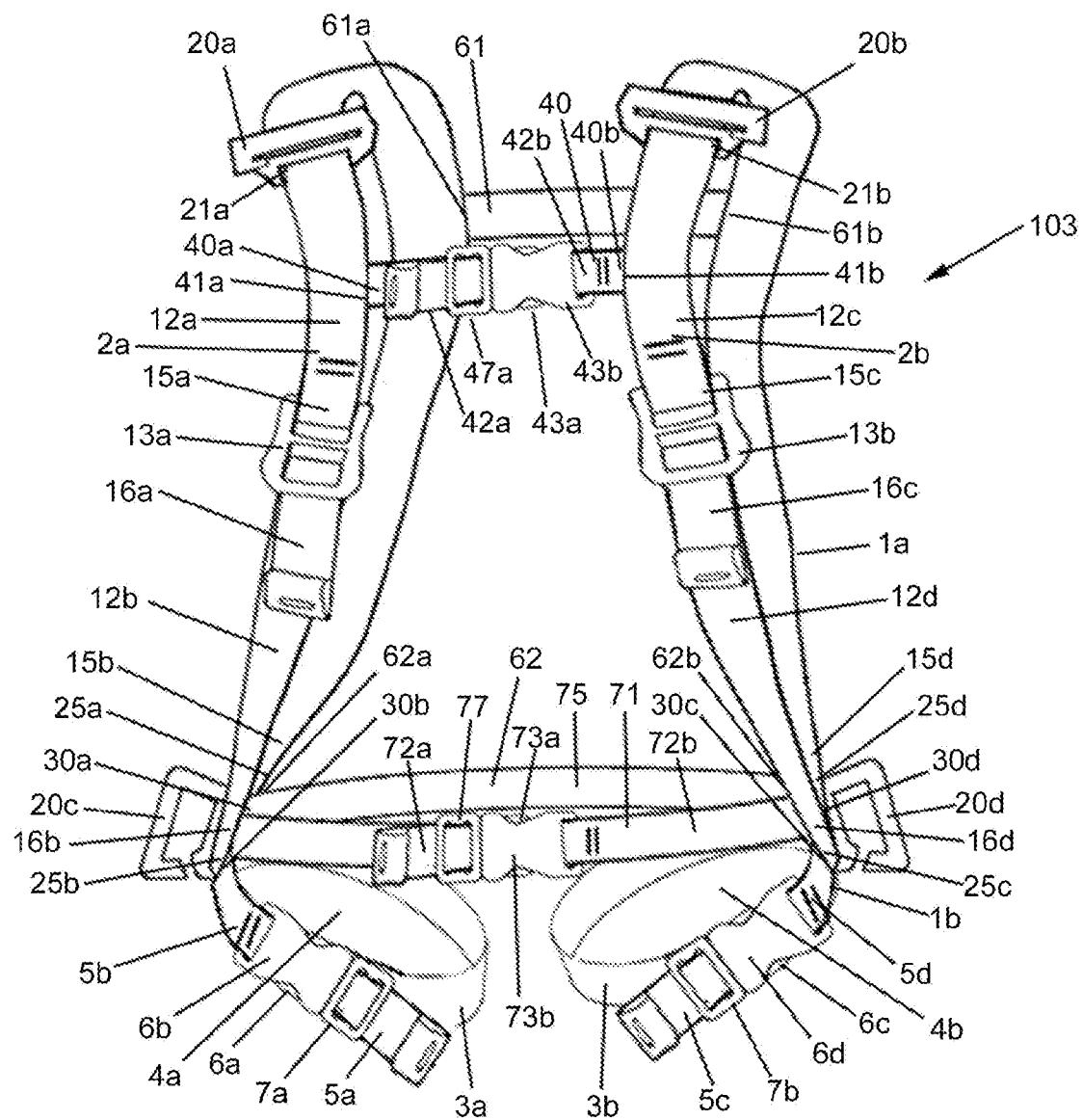
FIG. 3 provides a perspective view of a supplemental restraint harness according to a further embodiment of the present invention.

FIG. 3 is a perspective view of a supplemental restraint harness 103 according to a further embodiment of the present invention. The supplemental restraint harness 103 shown in FIG. 3 has many of the same features as the supplemental restraint harness 102 shown in FIG. 2 and like features are awarded the same reference numbers.

The supplemental restraint harness 103 further comprises a waist belt 71 which connects the first and second straps 2a,b. Specifically the waist belt 71 is connected to the first portion 12a and the second portion 12b of the first belt 2a and to the first portion 12c and the second portion 12d of the second belt 2b. The waist belt 71 is connected to the first and second straps 2a,b such that it is orientated substantially perpendicular to the first and second straps 2a,b. The waist belt 71 can be worn around a wearers waist. The waist belt 71 is connected at positions along the first and second straps 2a,b such that when the harness 103 is worn, the waist belt 71 can be located at the waist of the wearer.

The waist belt 71 has a first free end 72a and a second free end 72b. A first connector 73a is provided at the first free end 72a and a second connector 73b is provided at the second free end 72b; the first and second connectors 73a,73b can be connected so that the waist belt forms a closed loop 75 around a wearers waist. In this example the first connector 73a is a male member 73a of a snap clip system. The first connector 73a further comprises a strap adjuster buckle 77; the first free end 72a is woven through the strap adjuster buckle 77. As per the normal operation of strap adjuster buckles, the first free end 72a of the waist belt 71 can be drawn through the strap adjuster buckle 77 so as to shorten the effective length of the waist belt 71, thus decreasing the diameter of loop formed by the waist belt 71 when the first and second connectors 73a,b are connected; or can be pushed through the strap adjuster buckle 77 so as to increase the effective length of the waist belt 71, and thus increase the diameter of loop formed by the waist belt 71 when the first and second connectors 73a,b are connected. The strap adjuster buckle 77 thus allows adjustment of the waist belt 71 to fit different size waists.

During use the waist belt 71 is wrapped around the waist of the wearer and the effective length of the waist belt 71 is adjusted using the strap adjuster buckle 77 to fit to the waist of the wearer.

Figure 4A:
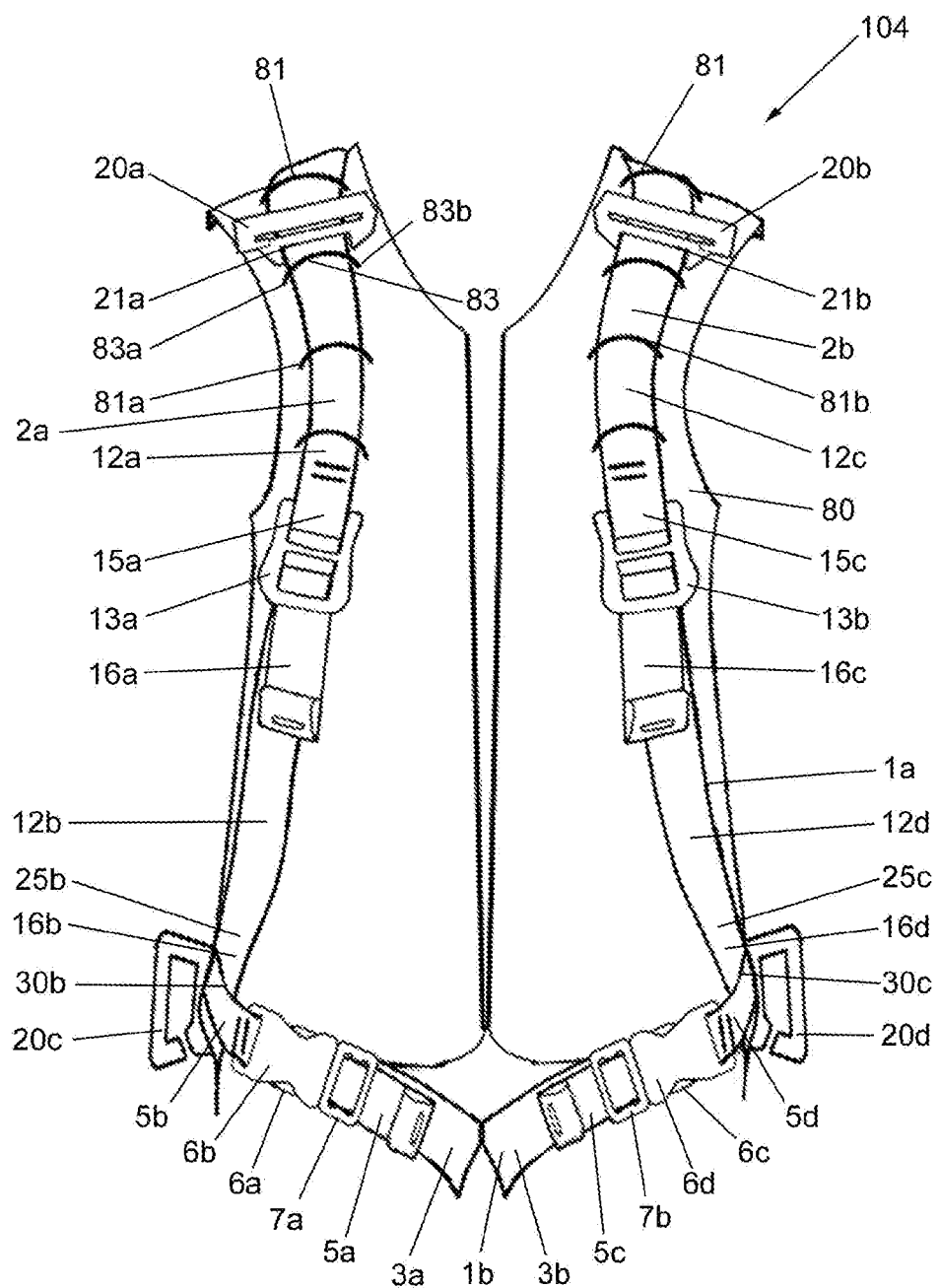
FIG. 4a provides a front view of a supplemental restraint harness according to a further embodiment of the present invention.
Figure 4B:
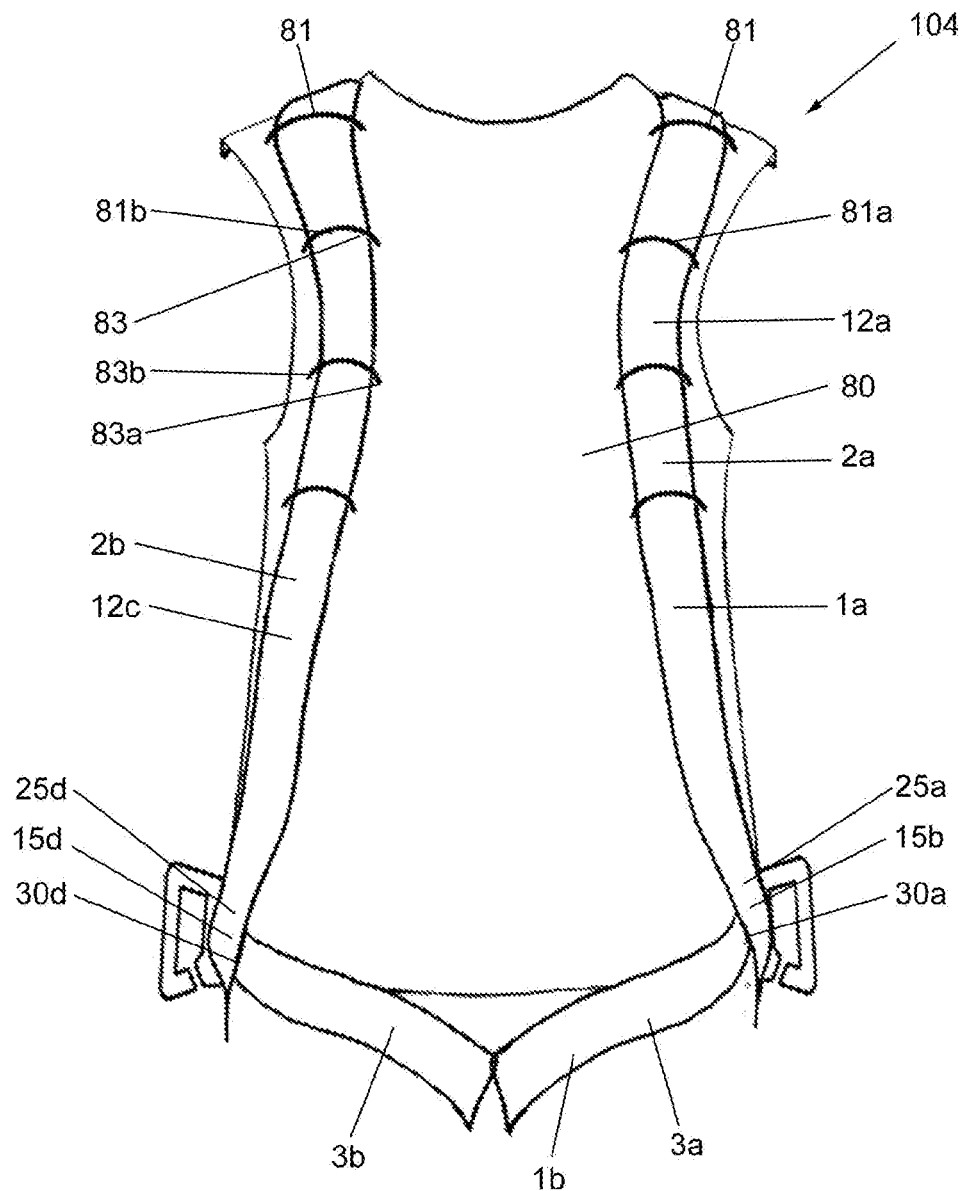

FIG. 4a is a front view of a supplemental restraint harness 104 according to a further embodiment of the present invention. FIG. 4b is a back view of the supplemental restraint harness 104. The supplemental restraint harness 104 shown in FIG. 4 has many of the same features as the supplemental restraint harness 1 shown in FIG. 1 and like features are awarded the same reference numbers.

Referring to FIGS. 4a and 4b, the supplemental restraint harness 104 comprises a garment 80. In this example the garment 80 is a waist coat 80. It should be understood that the garment 80 may take any suitable form. While in this example the garment 80 is in the form of a waist coat, in another embodiment the garment 80 may be a T-shirt, or vest, or jumper etc.

The supplemental restraint harness 104 further comprises attachment means 81,81a,81b for attaching the first and second straps 2a,2b to the garment 80. It should be understood that the attachment means may take any suitable form. In this embodiment the supplemental restraint harness 104 comprises one set 81a of guide members 81 which are fixed to the garment 80, and a second set 81b of guide members 81 which are fixed to the garment 80. The first strap 2a passes through each of the guide members 81 in the first set 81a, and the second strap 2b passes through each of the guide members 81 in the second set 81b. The guide members 81 prevent the first and second strap 2a,b from moving away from the garment 80; the first set 81a of guide members 81 thus attach the first strap 2a to the garment 80, and the second set 81b of guide members 81 attach the second strap 2b to the garment 80. The first strap 2a is free to move through each of the guide members 81 in the first set 81a; and the second strap 2b is free pass through each of the guide members 81 in the second set 81b. It should be understood that respective sets of guide members 81a,b may comprise any number of guide members 81; in this embodiment each set 81a,81b comprises a plurality of guide members 81; however in another embodiment each set 81a,81b may comprise only a single guide member 81.

The guide members 81 may take any suitable form. In the supplemental restraint harness 104 each guide member is defined by a respective strip 83, wherein opposite ends 83a,83b of the strip 83 are fixed to the garment 80 so that the strip 83 forms an arch; the arch formed has dimensions large enough so that the first or second strip 2a,2b can pass through the arch. In one embodiment the second portion 12b of the first strap 2a is fixed to the garment 80 (for example the second portion is stitched to the garment 80), and the first portion 12a of the first strap 2a passes through the first group 81a of guide members 81 and is free to move within the guide members 81 so that the effective length of the first strap 2a can be adjusted; likewise the second portion 12d of the second strap 2b is fixed to the garment 80 (for example the second portion 2b is stitched to the garment 80), and the first portion 12c of the second strap 2b passes through the second group 81b of guide members 81 and is free to move within the guide members 81 so that the effective length of the second strap 2b can be adjusted.

Figure 5A:
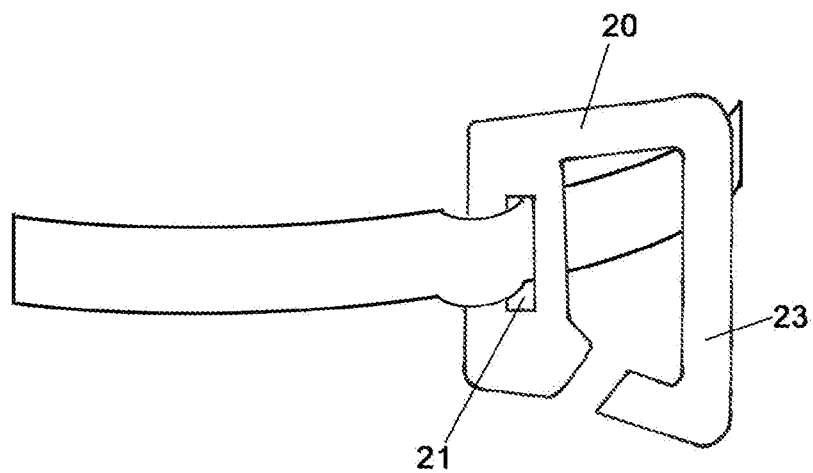
FIGS. 5a-5c illustrate different possible configurations for any of the connector provided in any of the supplemental restraint harnesses shown in any of FIGS. 1-4a,b.
Figure 5B:
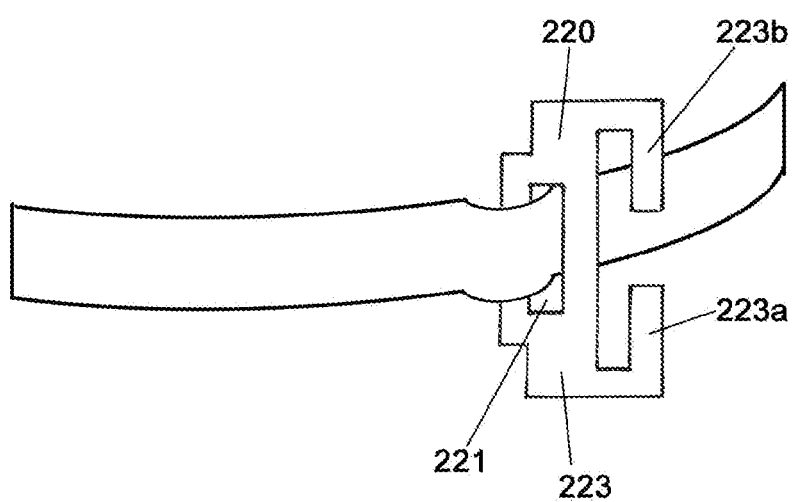
Figure 5C:
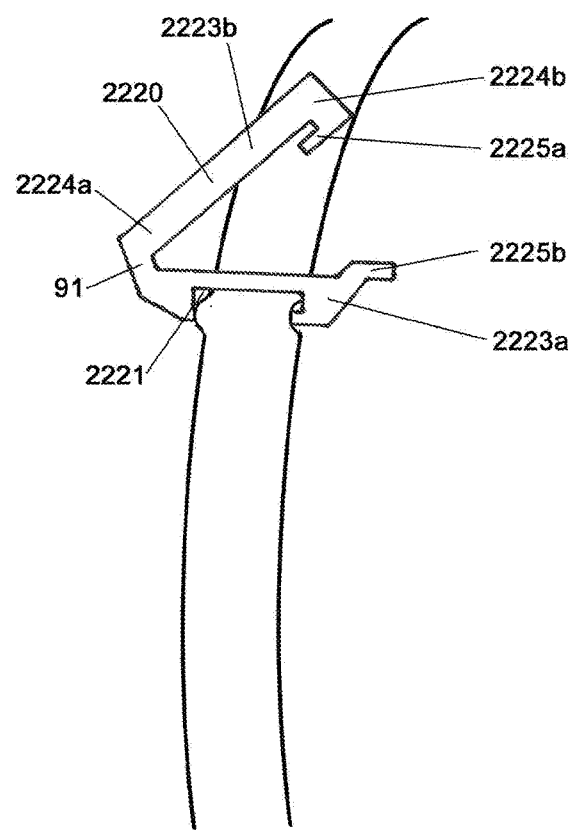

It should be noted that the connector 20a-d used in the supplemental restraint harness of the present invention may take any suitable form which will allow them to connect to a seat belt. For example in each of the supplemental restraint harness 1,102,103,104 embodiments shown in FIGS. 1-4 the connectors 20a-d may take any suitable configuration which will allow them to connect to a seat belt. In one embodiment each connector 20a-d is defined by a respective strap, or some other member, which has a hook and loop fastener; the strap, or member, which defines a connector 20a-d may be wrapped around the seat belt and fastened using the hook and loop fastener so as to connect the supplemental restraint harness to the seat belt. FIGS. 5a-5c provide some other examples of possible configurations for the connectors 20a-d which can be used in the supplemental restraint harness of the present invention.

Referring to FIG. 5a, FIG. 5a shows one possible example of a connector 20; any one or more of the connectors 20a-d in the above-mentioned supplemental restraint harnesses 1,102,103,104 may take the form of the connector 20 shown in FIG. 5a. The connector 20 comprises an aperture 21 defined therein, through which a strap (e.g. the first, second, third, or fourth strap 2a,2b,3a,3b) can pass. In one embodiment the aperture 21 is dimensioned so that the strap is free to move through the aperture 21 so as to allow the connector 20 to be moved along the strap 2; in this manner the position of the connector 20 along the strap can be adjusted. In another embodiment the connector 20 is fixed to strap so that connector 20 has a fixed position along the length of the strap.

The connector 20 further comprises a hook member 23. The hook member 23 can be hooked onto a seat belt to connect the supplemental restraint harness 1,102,103,104 to the seat belt.

Referring to FIG. 5b, FIG. 5b shows another possible example of a connector 220; any one or more of the connectors 20a-d in the above-mentioned supplemental restraint harnesses 1,102,103,104 may take the form of the connector 220 shown in FIG. 5b. The connector 220 comprises an aperture 221 defined therein, through which a strap (e.g. the first, second, third, or fourth strap 2a,2b,3a,3b) can pass. In one embodiment the aperture 221 is dimensioned so that the strap is free to move through the aperture 221 so as to allow the connector 220 to be moved along the strap; in this manner the position of the connector 220 along the strap can be adjusted. In another embodiment the connector 222 is fixed to strap so that connector 220 has a fixed position along the length of the strap.

The connector 220 further comprises a C-shaped member 223. The C-shaped member 223 defines opposing hook members 223a, 223b; the opposing hook members 223a, 223b can be hooked onto a seat belt to connect the supplemental restraint harness 1,102,103,104 to the seat belt.

Referring to FIG. 5c, FIG. 5c shows another possible example of a connector 2220; any of the connectors 20a-d in the above-mentioned supplemental restraint harnesses 1,102,103,104 may take the form of the connector 2220 shown in FIG. 5c.

The connector 2220 comprises an anchor member 2223a and a latch member 2223b.

The anchor member 2223a comprises an aperture 2221 defined therein, through which a strap (e.g. the first, second, third, or fourth strap 2a,2b,3a,3b) can pass. In one embodiment the aperture 2221 is dimensioned so that the strap is free to move through the aperture 2221 so as to allow the connector 2220 to be moved along the strap; in this manner the position of the connector 2220 along the strap can be adjusted. In another embodiment the connector 2220 is fixed to strap so that connector 2220 has a fixed position along the length of the strap.

The latch member 2223b has a first end 2224a which is pivotally attached to the anchor member 2223a at a pivot point 91 and a second, opposite end 2224b. The second opposite end 2224b is a free end 2224b. The second opposite end 2224b further comprises a connecting means 2225a which can connect to a connecting means 2225b provided on the anchor member 2223a. It should be understood that the connecting means 2225a, 2225b may take any suitable configuration. In this example the connecting means 2225a on the latch member 2223b is a connector 2225a which is configured to snap fit to the connecting means 2225b on the anchor member 2223a.

The latch member 2223b and the anchor member 2223a are shaped so that when the connecting means 2225a,2225b on the respective anchor member 2223a and latch member 2223b are connected, the anchor member 2223a and latch member 2223b define a channel at their interface which can receive a strap of a seat belt.

In order to attach the connector 2220 to a seat belt, the latch member 2223b is pivoted about the pivot point 91 so as to move the connector 2225a on the latch member 2223b away from the connecting means 2225b on the anchor member 2223a. The seat belt is positioned between the latch member 2223b and anchor member 2223a; while maintaining the seat belt in a position between the latch member 2223b and anchor member 2223a, the latch member 2223b is pivoted about the pivot point 91 to bring the connector 2225a on the latch member to connect with the connecting means 2225b on the anchor member 2223a, so that the seat belt is retained in the channel which is defined at the interface between the latch member 2223b and the anchor member 2223a when the connecting means 2223a,2223b are connected.

Figure 6A:
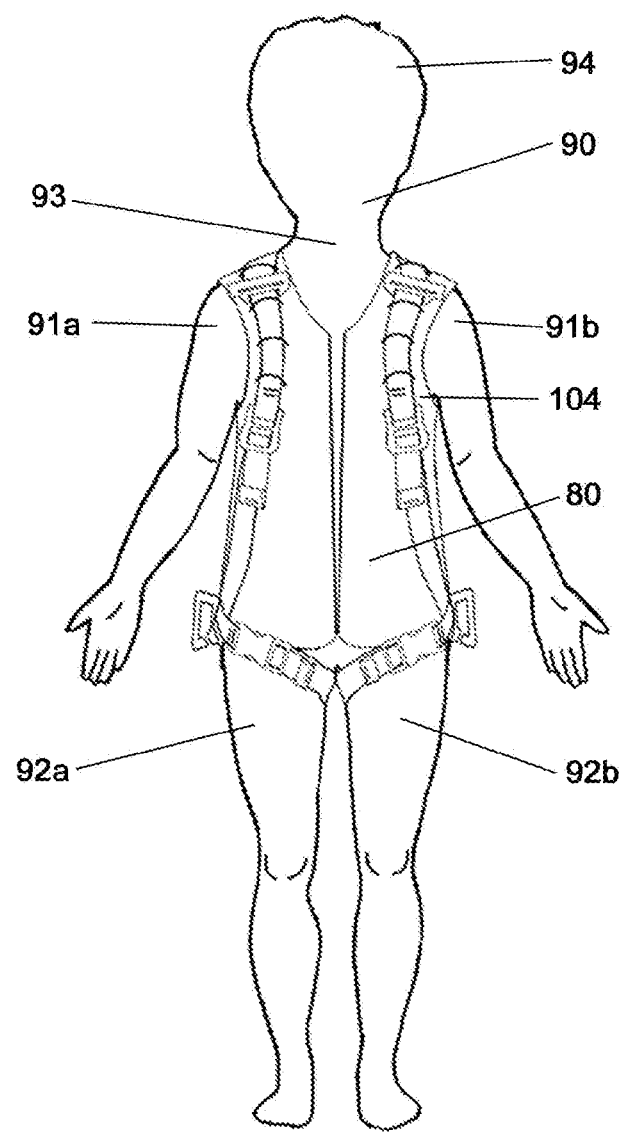
FIG. 6a shows the supplemental restraint harness of FIGS. 4a,b once applied to a wearer i.e. worn by the wearer.
Figure 6B:
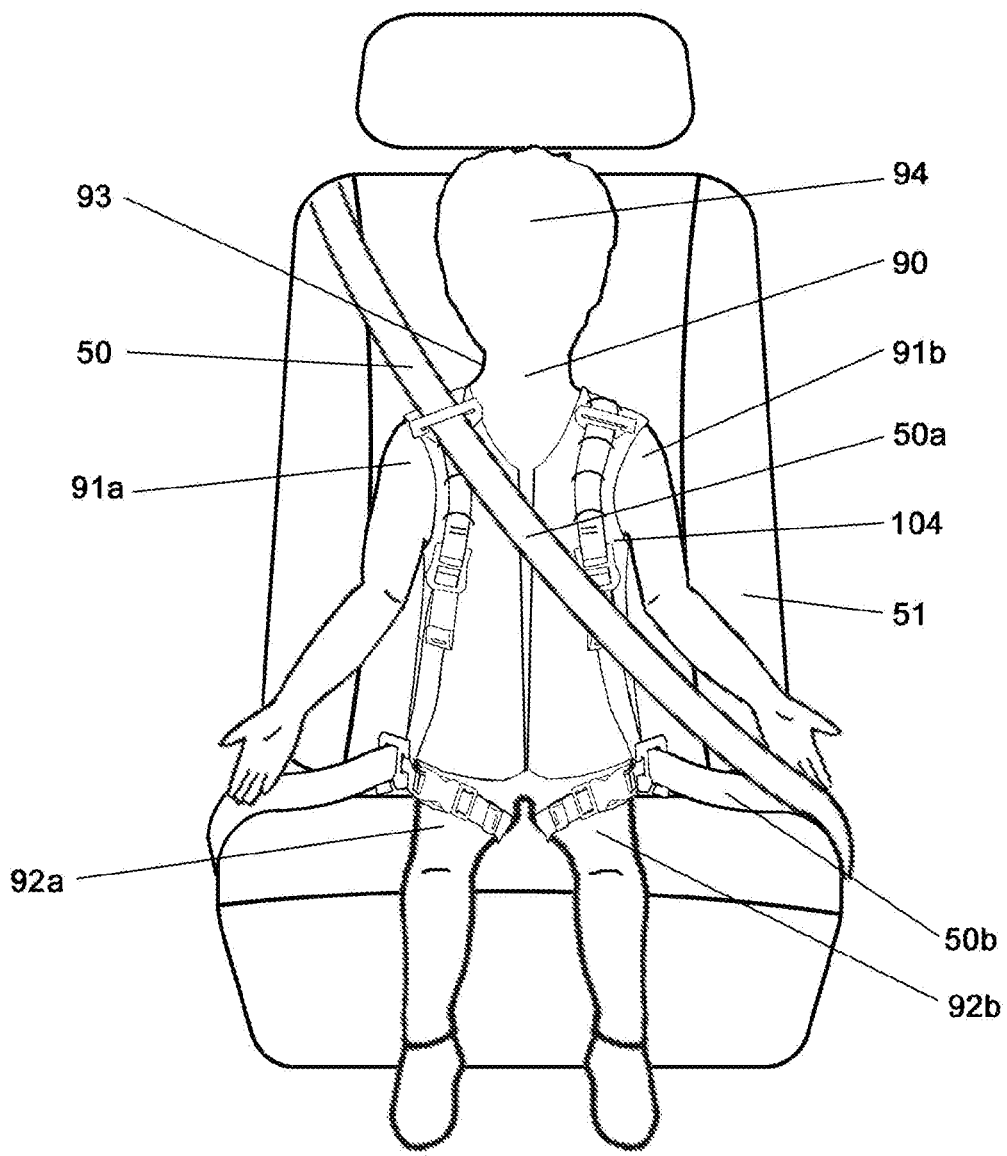
FIG. 6b shows the supplemental restraint harness of FIGS. 4a,b during use.
Figure 7:
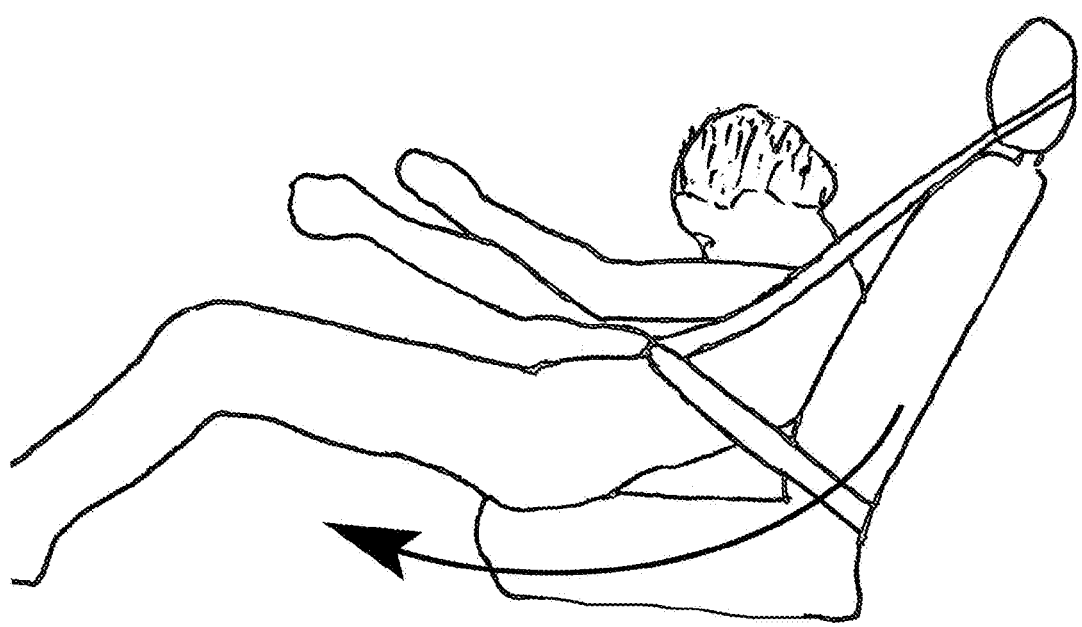
FIG. 7 provides an illustration of 'submarining'.

FIG. 6b illustrates the preferred use of the harness according to the present invention when used with a three-point seat belt 50 which, when buckled, provides a sash belt 50a and a lap belt 50b. The three-point seat belt 50 configured to restrain a person sitting in a vehicle seat 51. Although FIG. 5b illustrates the preferred use of the supplemental restraint harness 104 shown in FIGS. 4a,4b, it should be understood that all embodiments of the supplemental restraint harness 1,102,103 can be used in a similar manner.

The supplemental restraint harness 104 is first applied to a wearer 90. FIG. 6a shows the supplemental restraint harness 104 after it has been applied to a wearer 90. The waist coat 80 is worn by the wearer 90; when the wearer puts on the waist coat 80, the first and second straps 2a,2b will be rest on the respective first and second shoulders 91a,91b of the wearer 90.

If the first strap 2a is too slack on the wearer 90, the first end 16a of the second portion 12b of the first strap 2a can be pulled through the first strap adjuster buckle 13a so as to shorten the effective length of the first strap 2a. Likewise if the first strap 2a is too tight on the wearer 90 the first end 16a of the second portion 12b of the first strap 2a can be pushed through the first strap adjuster buckle 13a so as to increase the effective length of the first strap 2a.

If the second strap 2b is too slack on the wearer 90, the first end 16c of the second portion 12d of the second strap 2b can be pulled through the second strap adjuster buckle 13b so as to shorten the effective length of the second strap 2b. Likewise if the second strap 2b is too tight on the wearer 90 the first end 16c of the second portion 12d of the second strap 2b can be pushed through the second strap adjuster buckle 13b so as to increase the effective length of the second strap 2b.

The first and second connectors 6a,6b on the respective first free end 5a and second free end 5b of the third strap 3a are connected to one another so that the third strap 3a forms said first loop 4a around the wearers first leg 92a; specifically, the male member 6a is snap fit to the female member 6b so that the third strap 3a forms the first loop 4a around the wearers first leg 92a. If necessary, using the strap adjuster buckle 7a the effective length of the third strap 3a can be adjusted so as to adjust diameter of the first loop 4a to fit the diameter the wearer's first leg 92a.

The first and second connectors 6c,6d on the respective a first free end 5c and second free end 5d of the fourth strap 3b are connected to one another so that the fourth strap 3b forms said second loop 4b around the wearers second leg 92b. Specifically, the male member 6c can snap fit to the female member 6d so that the fourth strap 3b forms the second loop 4b around the wearers second leg 92b. If necessary, using the strap adjuster buckle 7b the effective length of the fourth 3b can be adjusted so as to adjust diameter of the second loop 4b to fit the diameter the wearer's second leg 92b.

In this example the seat belt 50 is configured to cross from right to left of the wearer 90 (from the perspective of the wearer), accordingly the first connector 20a will be used to connect to the sash belt 50a. Accordingly, the first connector 20a is moved along the first strap 2a so that it is located below the neck level 93 of the wearer 90. It should be understood if the seat belt 50 would be configured to cross from left to right of the wearer (from the perspective of the wearer) accordingly second connector 20b will be used to connect to the sash belt 50a. Accordingly, the second connector 20b would be moved along the second strap 2b so that it is located below the neck level 93 of the wearer 90.

The seat belt 50 is drawn and is then buckled. After the seat belt 50 has been buckled, the wearer 90 sits in the vehicle seat 51. The sash belt 50b is drawn over the head 94 of the wearer 90 and is connected to the first connector 20a, as shown in FIG. 6b.

In this exemplary use, the lap belt 50b remains behind the wearer 90 so that the lap belt 50b is located between the wearer 90 and the vehicle seat 51. The third connector 20c is connected to the lap belt 50b and the fourth connector 20d is connected to the lap belt 50b.

Advantageously, in the case of a vehicle collision, the harness 104 will restrain the wearer 90 at the torso and at the legs 92a,b. The first connector 20a will maintain the sash belt 50a from moving to the neck level 93 of the wearer 90 thus preventing the sash belt 50a from applying any restraint directly to the neck of the wearer 90. Moreover, the third and fourth strap 3a,3b will restrain the wearer 90 at the first and second legs 92a,b thus preventing the wearer from submarining. Additionally, the supplemental restraint harnesses 104 is more compact than existing booster seats, and thus is portable; a user can easily carry the supplemental restraint harnesses 104.

Figure 8:
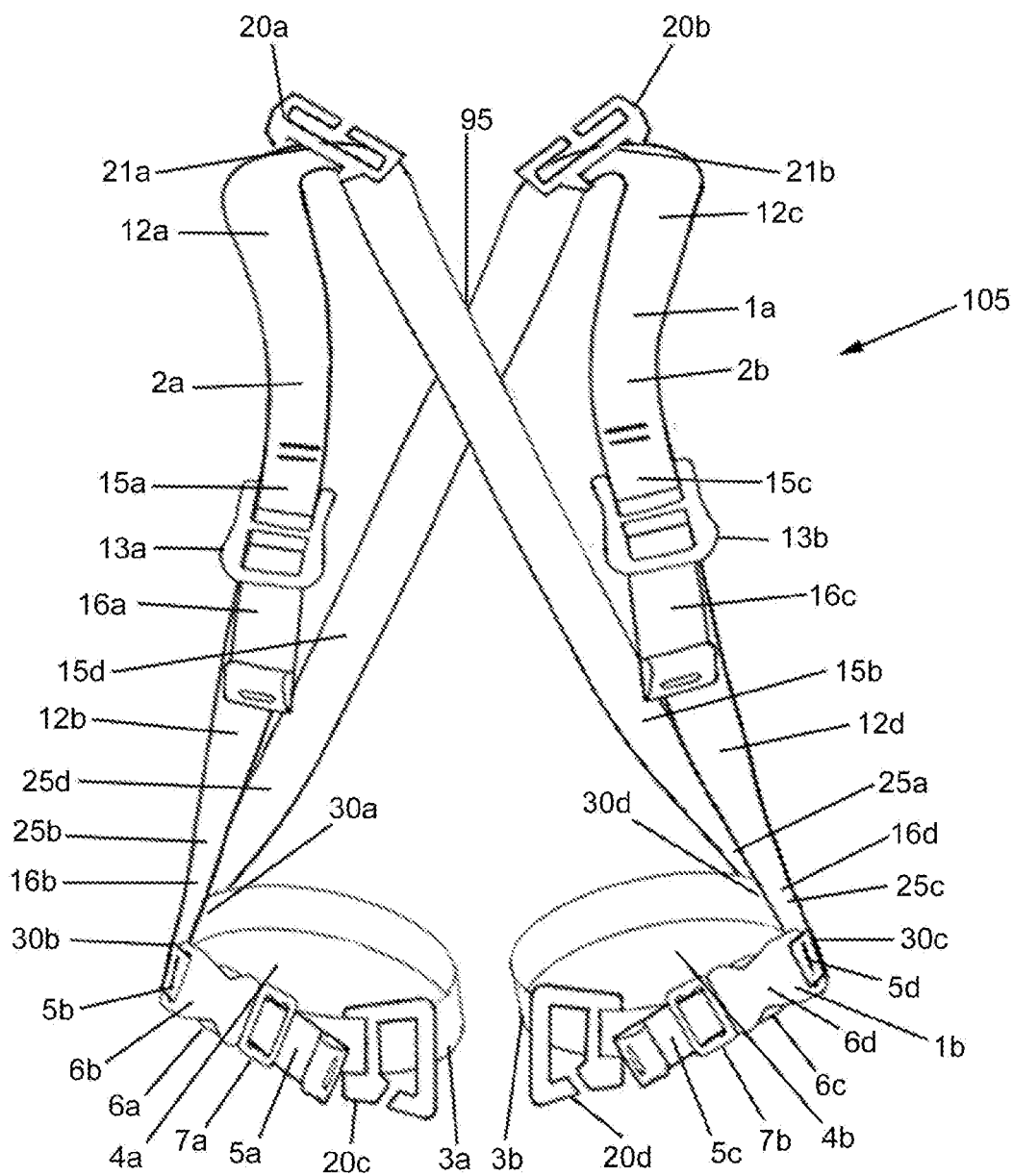
FIG. 8. provides a perspective view of a supplemental restraint harness according to a further embodiment of the present invention.

FIG. 8 is a front view of a supplemental restraint harness 105 according to a further embodiment of the present invention. The supplemental restraint harness 105 shown in FIG. 8 have many of the same features as the supplemental restraint harness 1,102, 103 and 104 shown in FIGS. 1 to 4a, and like features are awarded the same reference numbers.

In this example the first strap 2a is divided into two portions, a first portion 12a and second portion 12b, which are connected via a first strap adjuster buckle 13a. The first portion 12a has a first end 15a which is fixed to the first strap adjuster buckle 13a, and a second, opposite end 15b which is fixed to the fourth strap 3b at the fourth connection position 30d; the second portion 12b has a first end 16a which is woven through the first strap adjuster buckle 13a, and a second, opposite, end 16b which is fixed to the third strap 3a at the second connection position 30b.

In this example the second strap 2b is divided into two portions, a first portion 12c and second portion 12d, which are connected via a second strap adjuster buckle 13b. The first portion 12c has a first end 15c which is fixed to the second adjuster buckle 13b, and a second, opposite end 15d which is fixed to the third strap 3a at the first connection position 30a; the second portion 12d has a first end 16c which is woven through the strap adjuster buckle 13b, and a second, opposite, end 16d which is fixed to the fourth strap 3b at the third connection position 30c.

In the embodiment represented in FIG. 8, the first portion 12a of the first strap 2a and the first portion 12c of the second strap 2b are back crossed compared to the harness 1 of FIG. 1. In other words, the first strap 2a is connected to the fourth strap 3b on the fourth connection position 30d, said first strap 2a being also connected to the third strap 3a on the second connection position 30b; and the second strap 2b is connected to the third strap 3a on the first connection position 30a, said second strap 2b being also connected to the fourth strap 3b on the third connection position 30c, these connections resulting in the first strap 2a crossing the second strap 2b at a crossing point 95.

The first strap 2a and the second strap 2b can be crossed at any position of their respective length so that the position of the crossing point 95 can be adjusted.

Also in this embodiment the first connector 20a is provided on the first strap 2a and is positioned such that when the supplemental restraint harness 105 is worn, the first connector 20a will be located at the shoulder of the wearer; the second connector 20b which is provided on the second strap 2b and is positioned such that when the supplemental restraint harness 105 is worn, the second connector 20b will be located at the shoulder of the wearer. The third connector 20c is provided on the third strap 3a and is positioned such that when the supplemental restraint harness 105 is worn, the third connector 20c will be located on the lap of the wearer; and the fourth connector 20d which is provided on the fourth strap 3b and is positioned such that when the supplemental restraint harness 105 is worn, the fourth connector 20c will be located on the lap of the wearer. Each of the connector 20a-d is configured such that it can cooperate with a seat belt to connect the harness 105 to the seat belt; each connector 20a-d may have any suitable configuration which will allow them to be connected to a seat belt; some exemplary configurations for any of the connectors 20a-d will be described below with respect to FIGS. 5a-c.

In this embodiment the first and second straps 2a,2b have at least a portion which is elastic. Most preferably, the portion of the first and second straps 2a,2b which, when the supplemental restraint harness 105 is worn, are located at the front of the wearer, are elastic. In this embodiment the portion of the first strap 2a which is between the second connection position 30b and the first strap adjuster buckle 13a is elastic; and the portion of the second strap 2b which is between the third connection position 30c and the second strap adjuster buckle 13b is elastic. In other words, 12b and 12d of straps 2a and 2b are elastics.

Providing a portion of the first and second straps 2a,2b have at least a portion which is elastic increase the comfort of the harness. The fit of the harness on the wearer is improved.

Figure 9:
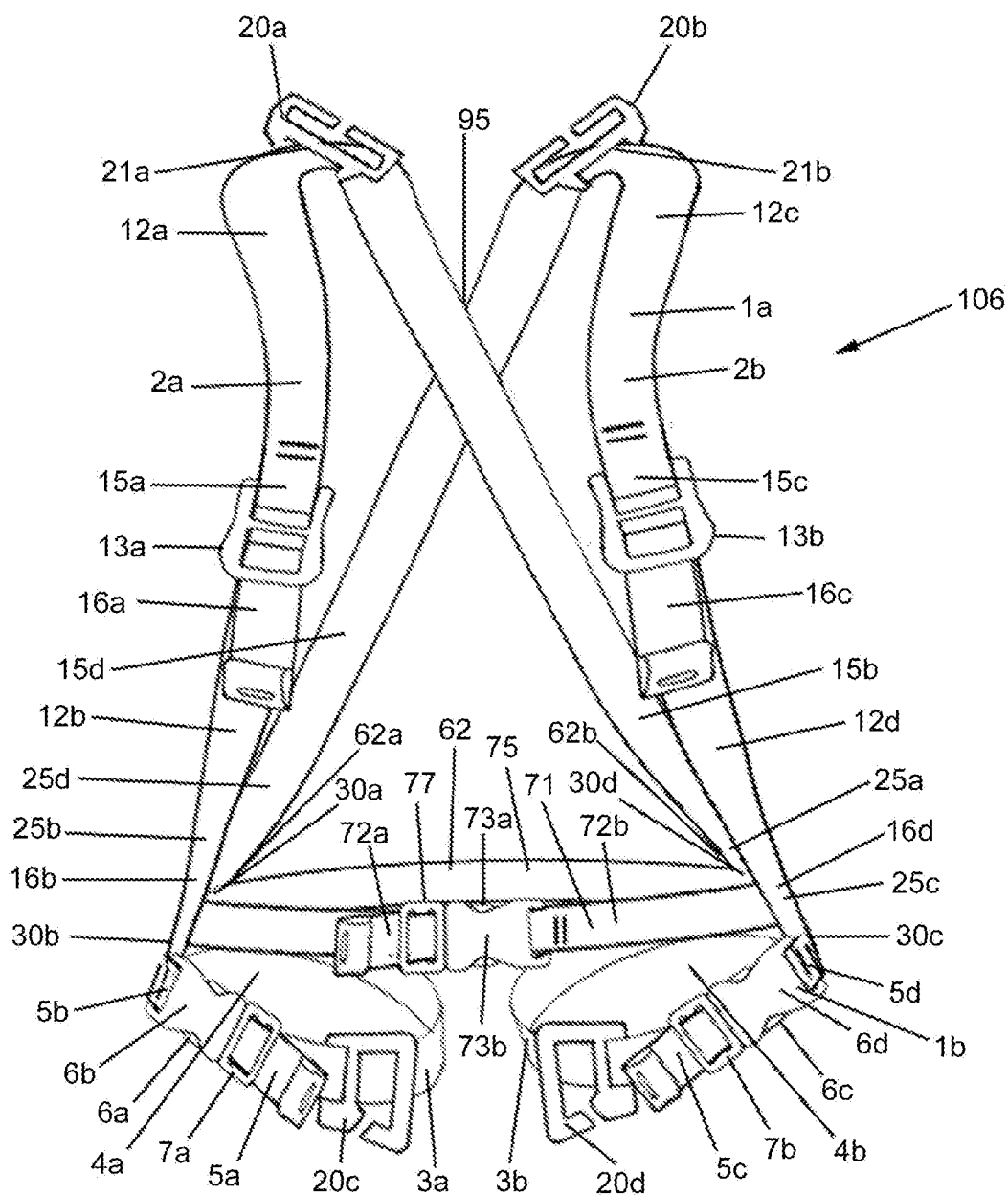
FIG. 9 provides a perspective view of a supplemental restraint harness according to a further embodiment of the present invention.

FIG. 9 is a front view of the supplemental restraint harness 106. The supplemental restraint harness 106 shown in FIG. 8 have many of the same features as the supplemental restraint harness 1,102, 103,104 and 105 shown in FIGS. 1 to 4a, and 8, and like features are awarded the same reference numbers.

In the embodiment represented in FIG. 9, the supplemental restraint harness 106 further comprises a waist belt 71 when compared to the supplemental harness of shown in FIG. 8, said waist belt 71 being similar to the one represented in FIG. 3. The waist belt 71 of the supplemental restraint harness 106 connects the first and second straps 2a,b. Specifically the waist belt 71 is connected to the first portion 12a and the second portion 12b of the first belt 2a and to the first portion 12c and the second portion 12d of the second belt 2b. The waist belt 71 is connected to the first and second straps 2a,b such that it is orientated substantially perpendicular to the first and second straps 2a,b. The waist belt 71 can be worn around a wearers waist. The waist belt 71 is connected at positions along the first and second straps 2a,b such that when the harness 106 is worn, the waist belt 71 can be located at the waist of the wearer.

The waist belt 71 has a first free end 72a and a second free end 72b. A first connector 73a is provided at the first free end 72a and a second connector 73b is provided at the second free end 72b; the first and second connectors 73a,73b can be connected so that the waist belt forms a closed loop 75 around a wearers waist. In this example the first connector 73a is a male member 73a of a snap clip system. The first connector 73a further comprises a strap adjuster buckle 77; the first free end 72a is woven through the strap adjuster buckle 77. As per the normal operation of strap adjuster buckles, the first free end 72a of the waist belt 71 can be drawn through the strap adjuster buckle 77 so as to shorten the effective length of the waist belt 71, thus decreasing the diameter of loop formed by the waist belt 71 when the first and second connectors 73a,b are connected; or can be pushed through the strap adjuster buckle 77 so as to increase the effective length of the waist belt 71, and thus increase the diameter of loop formed by the waist belt 71 when the first and second connectors 73a,b are connected. The strap adjuster buckle 77 thus allows adjustment of the waist belt 71 to fit different size waists.

During use the waist belt 71 is wrapped around the waist of the wearer and the effective length of the waist belt 71 is adjusted using the strap adjuster buckle 77 to fit to the waist of the wearer.

The supplemental restraint harness 106 further comprises a lower-back belt 62 which has opposite ends 62a,62b which connect to the first and second straps 2a,b respectively. The lower-back belt 62 is connected to the first and second straps 2a,b such that it is orientated substantially perpendicular to the first and second straps 2a,b. The lower-back belt 62 is connected at positions along the first and second straps 2a,b such that when the harness 102 is worn, the lower-back belt 62 is located at the lower back of the wearer.

It should be understood that the upper-back belt 61 and lower-back belt 62 are optional features; any of the embodiments described herein may be without an upper-back belt 61 and lower-back belt 62, or may have both the upper-back belt 61 and lower-back belt 62, or may have only one of the upper-back belt 61 or lower-back belt 62.

Figure 10:
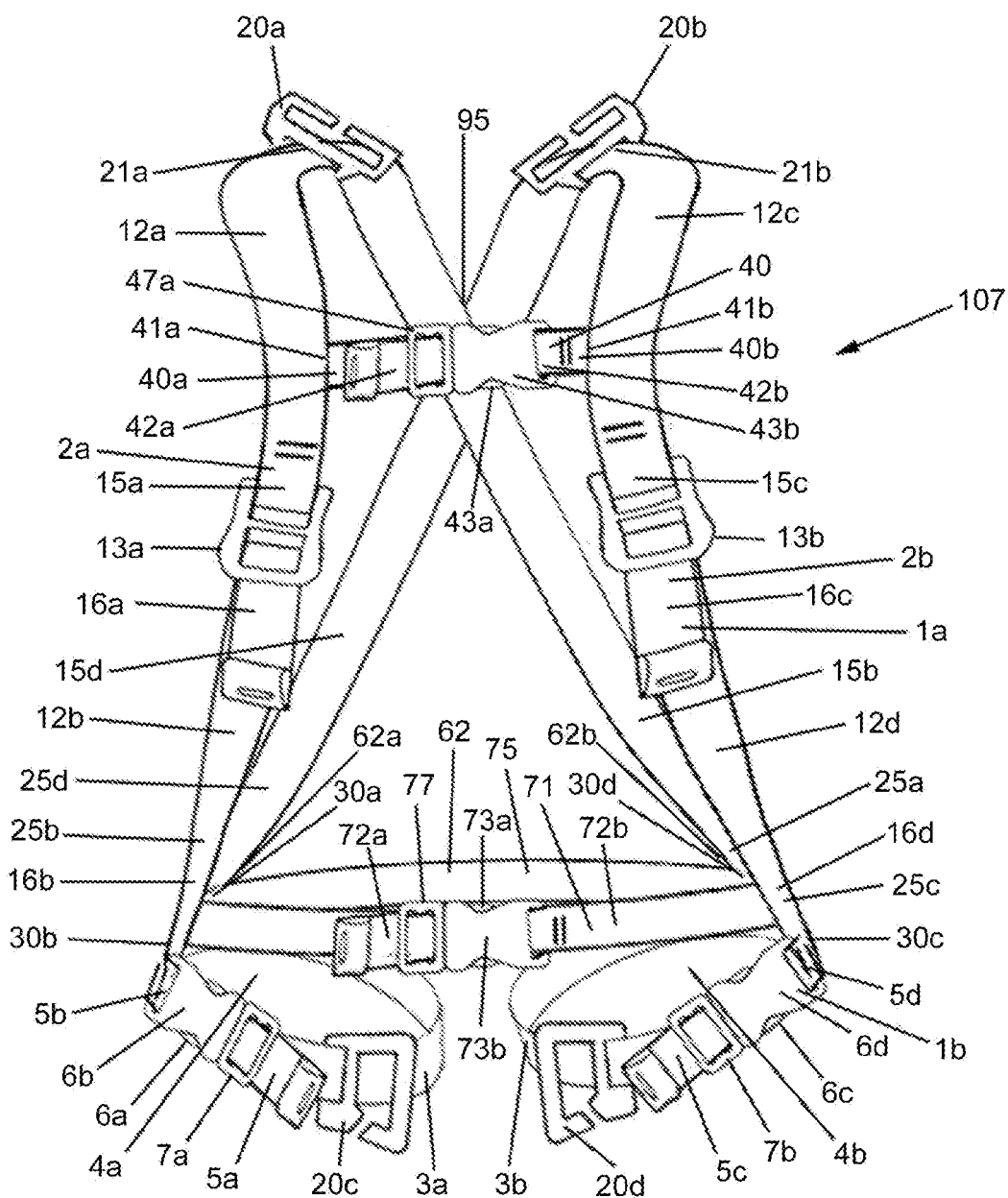
FIG. 10 provides a perspective view of a supplemental restraint harness according to a further embodiment of the present invention.

FIG. 10 is a front view of the supplemental restraint harness 107. The supplemental restraint harness 107 shown in FIG. 8 have many of the same features as the supplemental restraint harness 1,102, 103,104, 105 and 106 shown in FIGS. 1 to 4a, 8 and 9, and like features are awarded the same reference numbers.

In the embodiment represented in FIG. 10, the supplemental restraint harness 107 further comprises a chest belt 40 similar to the one represented in FIGS. 1 to 3 when compared to the supplemental harness of shown in FIG. 9.

The supplemental restraint harness 107 shows in FIG. 10 further comprises a chest belt 40 which connects the first and second straps 2a,b. The chest belt 40 is connected to the first and second straps 2a,b such that it is orientated substantially perpendicular to the first and second straps 2a,b. The chest belt 40 is connected at positions along the respective first and second straps 2a,b such that when the harness 107 is worn, the chest belt 40 is located at the sternum of the wearer. In this example the chest belt is divided into two portions 40a,b, namely a first portion 40a and a second portion 40b.

The first portion 40a has a first end 41a which is fixed to the first strap 2a, and a second opposite end 42a which is a free end 42a. The first portion 40a further comprises a first connector 43a; in this example the first connector 43a is a male member 43a of a snap clip system. The first connector 43a further comprises a strap adjuster buckle 47a; the free end 42a of the first portion 40a is woven through the strap adjuster buckle 47a. As per the normal operation of strap adjuster buckles, the free end 42a of the second portion can be pulled through the strap adjuster buckle 47a so as to shorten the effective length of the first portion 40a thus decreasing the effective length of the chest strap 40, or, can be pushed through the strap adjuster buckle 47a so as to increase the effective length of the first portion 40a thus increasing the effective length of the chest strap 40.

The second portion 40b has a first end 41b which is fixed to the second strap 2b, and a second opposite end 42b which is a free end 42b. The second portion 40b further comprises a second connector 43b; in this example the second connector 43b is a female member 43b of a snap clip system. The first and second connectors 43a,43b can connect to one another to connect first and second portions 40a,40b; specifically, the male member 43a can snap fit to the female member 43b so as to connect the first and second portions 40a,40b.

Figure 11A:
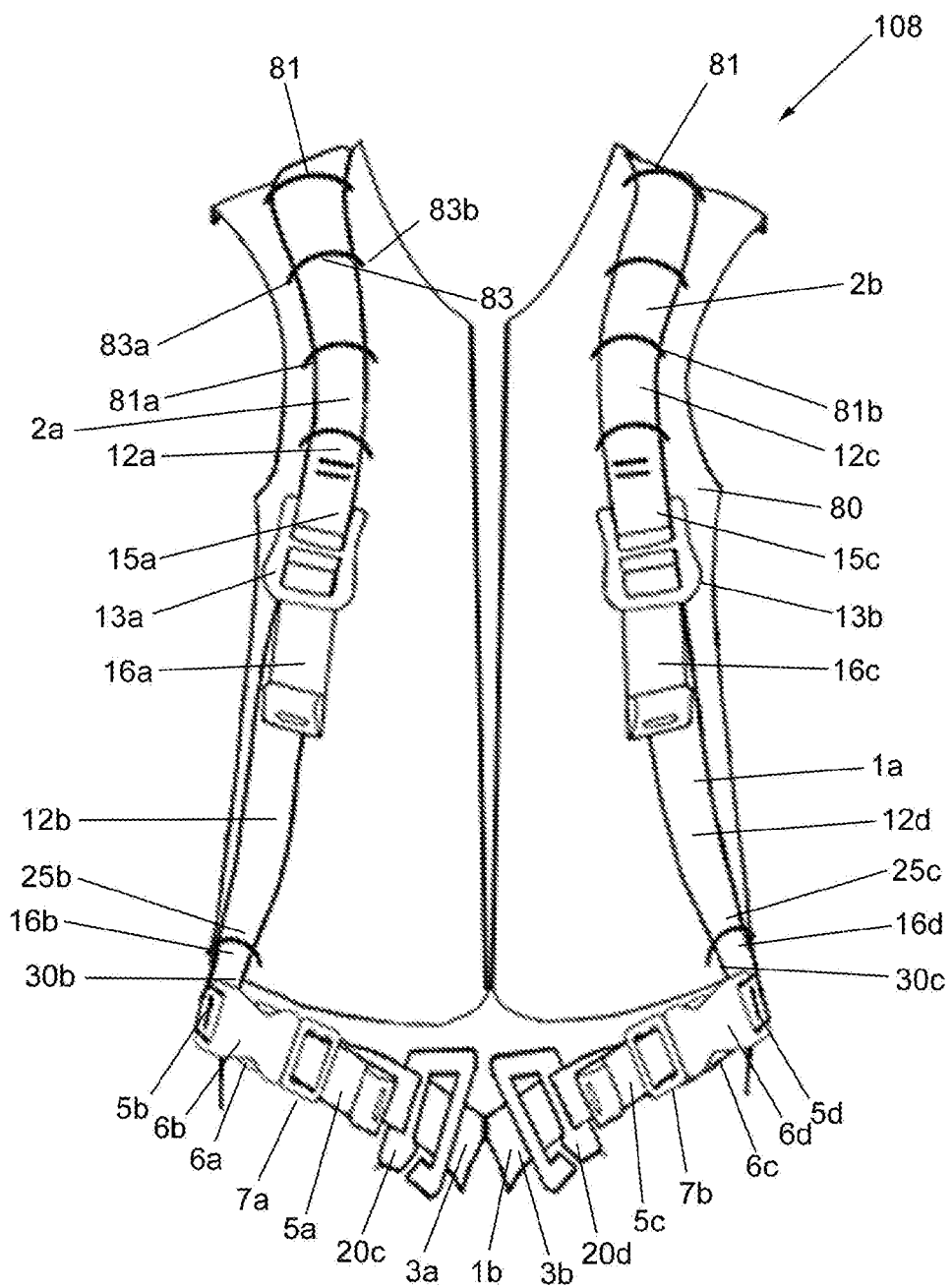
FIG. 11a provides a front view of a supplemental restraint harness according to a further embodiment of the present invention.
Figure 11B:
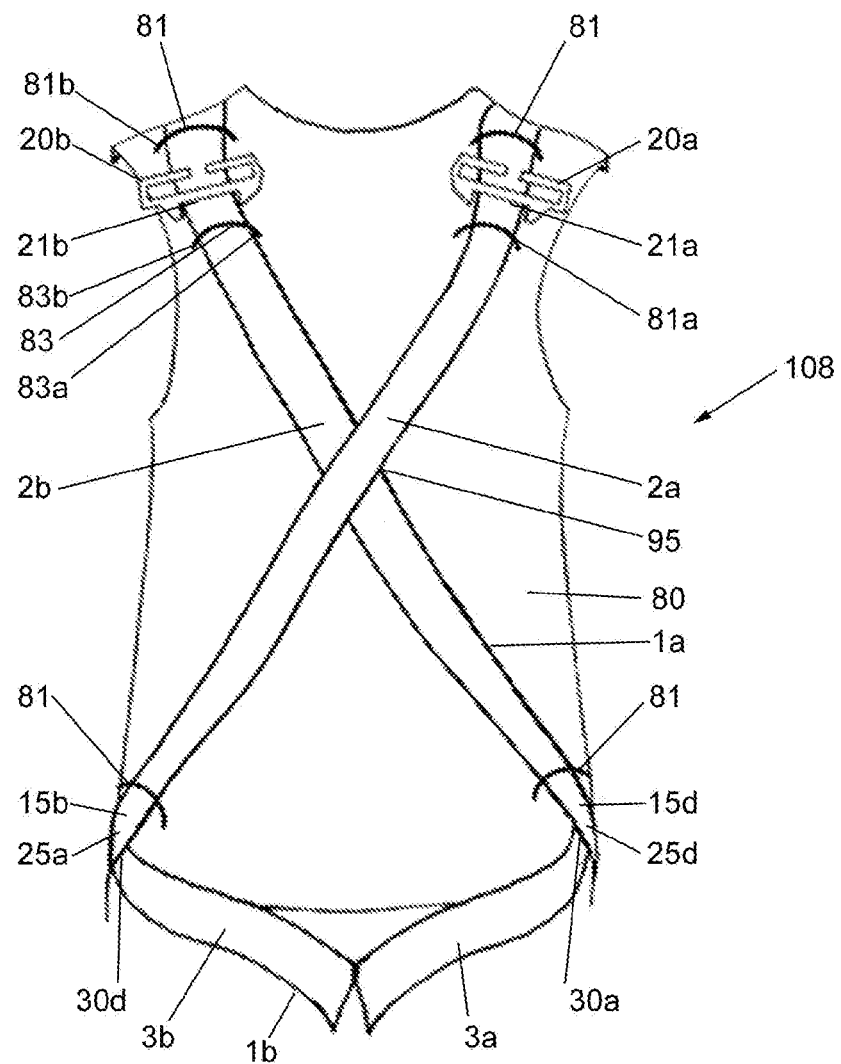

FIG. 11a is a front view of a supplemental restraint harness 108 according to a further embodiment of the present invention. FIG. 11b is a back view of the supplemental restraint harness 108. The supplemental restraint harness 108 shown in FIGS. 11a and b has many of the same features as the supplemental restraint harness 1, 102, 103, 104, 105, 106 and 107 shown in FIGS. 1 to 4a, 8 to 10 and like features are awarded the same reference numbers.

Referring to FIGS. 11a and 11b, the supplemental restraint harness 108 comprises a garment 80. In this example the garment 80 is a waist coat 80. It should be understood that the garment 80 may take any suitable form. While in this example the garment 80 is in the form of a waist coat, in another embodiment the garment 80 may be a T-shirt, or vest, or jumper etc.

The supplemental restraint harness 108 further comprises attachment means 81,81a,81b for attaching the first and second straps 2a,2b to the garment 80. It should be understood that the attachment means may take any suitable form. In this embodiment the supplemental restraint harness 108 comprises one set 81a of guide members 81 which are fixed to the garment 80, and a second set 81b of guide members 81 which are fixed to the garment 80. The first strap 2a passes through each of the guide members 81 in the first set 81a, and the second strap 2b passes through each of the guide members 81 in the second set 81b. The guide members 81 prevent the first and second strap 2a,b from moving away from the garment 80; the first set 81a of guide members 81 thus attach the first strap 2a to the garment 80, and the second set 81b of guide members 81 attach the second strap 2b to the garment 80. The first strap 2a is free to move through each of the guide members 81 in the first set 81a; and the second strap 2b is free pass through each of the guide members 81 in the second set 81b. It should be understood that respective sets of guide members 81a,b may comprise any number of guide members 81; in this embodiment each set 81a,81b comprises a plurality of guide members 81; however in another embodiment each set 81a,81b may comprise only a single guide member 81.

The guide members 81 may take any suitable form. In the supplemental restraint harness 108 each guide member is defined by a respective strip 83, wherein opposite ends 83a,83b of the strip 83 are fixed to the garment 80 so that the strip 83 forms an arch; the arch formed has dimensions large enough so that the first or second strip 2a,2b can pass through the arch. In one embodiment the second portion 12b of the first strap 2a is fixed to the garment 80 (for example the second portion is stitched to the garment 80), and the first portion 12a of the first strap 2a passes through the first group 81a of guide members 81 and is free to move within the guide members 81 so that the effective length of the first strap 2a can be adjusted; likewise the second portion 12d of the second strap 2b is fixed to the garment 80 (for example the second portion 2b is stitched to the garment 80), and the first portion 12c of the second strap 2b passes through the second group 81b of guide members 81 and is free to move within the guide members 81 so that the effective length of the second strap 2b can be adjusted.

In this embodiment, the supplemental restraint harness 108 comprises a first connector 20a which is provided on the first strap 2a and positioned onto the shoulder blade when the harness 108 is worn, a second connector 20b which is provided on the second strap 2b and positioned onto the opposite shoulder blade when the harness 108 is worn.

In the supplemental restraint harness 108 shown in FIGS. 11a and 11b, the first connector 20a which is provided on the first strap 2a, the second connector 20b which is provided on the second strap 2b, the third connector 20c which is provided on the third strap 3a, and the fourth connector 20d which is provided on the fourth strap 3b.

Figure 13:
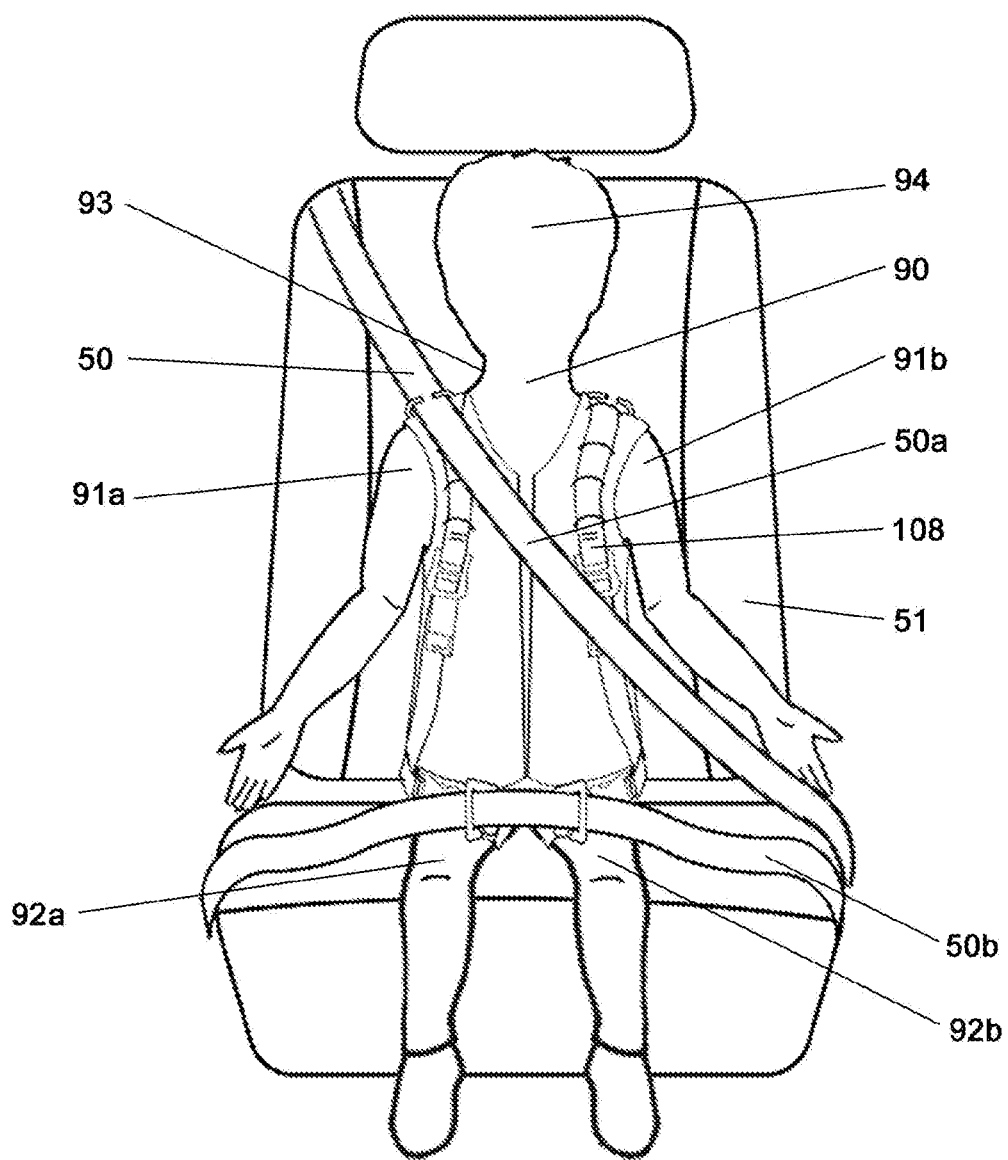
FIG. 13 shows the supplemental restraint harness of FIGS. 11a,b during use.

In the harness 108 shown in FIGS. 11a and b, the first connector 20a and the second connector 20b are positioned onto the shoulder blade when the harness 108 is worn as represented in FIG. 13 whereas in the harness 1, 102, 103 and 104 represented on a user in FIG. 6a the first connector 20a and the second connector 20b are positioned on a portion of their respective strips in proximity of the collarbone on the torso of the user when the harness is worn.

In this embodiment, the first connector 20a and the second connector 20b are C-shaped connectors 220 as shown in FIG. 5b.

Figure 12A:
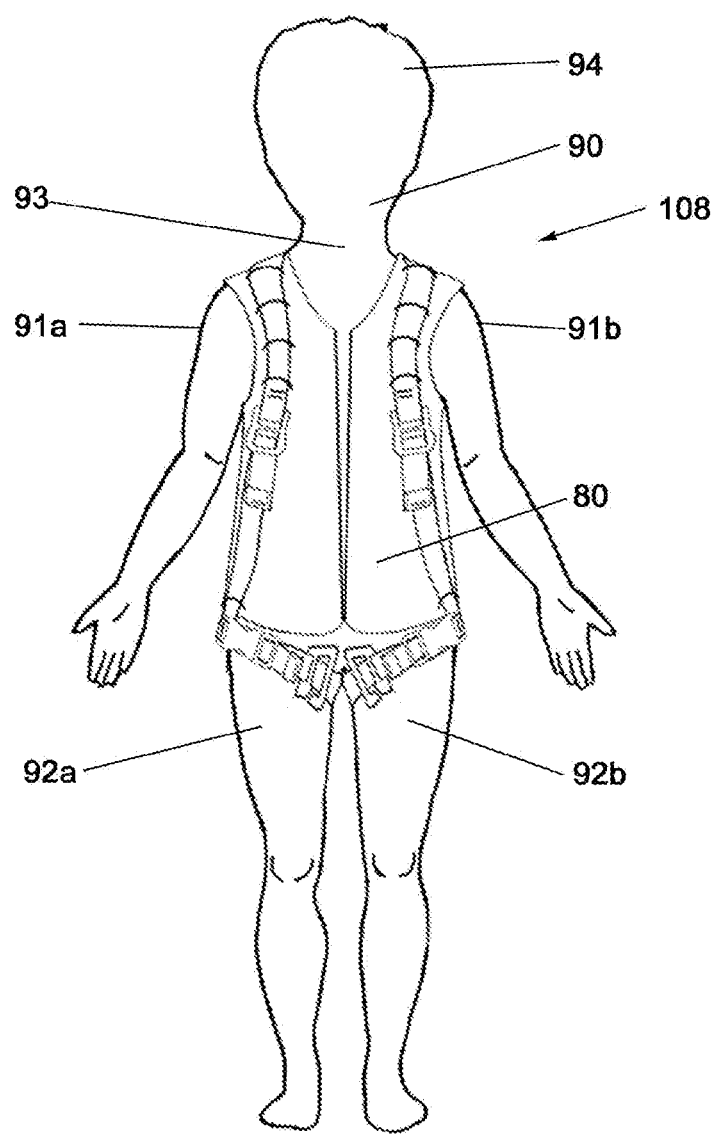
FIG. 12a shows a front view the supplemental restraint harness of FIGS. 11a,b once applied to a wearer i.e. worn by the wearer.

In the supplemental restraint harness shown in FIGS. 11a and 11b the third connector 20c is connected to the third strap 3a and positioned on the first loop substantially opposite the first connection position 30a and second connection position 30b whereas in the harness 1 shown in FIG. 1, the third connector 20c is placed at a position between the first connection position 30a and the second connection position 30b. In other words, the third connector 20c is positioned between the first connection position 30a and the first free end 5a close to the strap adjuster buckle 7a so that when the harness 108 is worn as shown in FIG. 12a the third connector 20c is placed on the surface of the right leg 92a. Preferably, the connector 20c is placed on the upper part of the right leg when the harness 108 is worn.

Similarly, the fourth connector 20d is connected to the fourth strap 3b and positioned on the second loop substantially opposite the third connection position 30c and fourth connection position of the loop 30d whereas in the harness 1 shown in FIG. 1, the fourth connector 20d is placed at a position between the third connection position 30c and the fourth connection position 30d. In other words, the fourth connector 20d is positioned between the fourth connection position 30d and the first free end 5c close to the strap adjuster buckle 7b so that when the harness 108 is worn as shown in FIG. 12a the fourth connector 20d is placed on the surface of the left leg 92b. Preferably, the connector 20d is placed on the upper part of the right leg when the harness 108 is worn.

In particular, the position of the third connector 20c is not fixed but can be tuned on the length of a portion of the third strap 3a substantially opposite the first connection position 30a.

In particular, the position of the fourth connector 20d is not fixed but can be tuned on the length of a portion of the fourth strap 3b substantially opposite the fourth connection position 30d.

In this embodiment, the third connector 20*c* and the fourth connector 20*d* connector 20 each comprises a hook member 23 as represented in FIG. 5*a*.

Figure 12B:
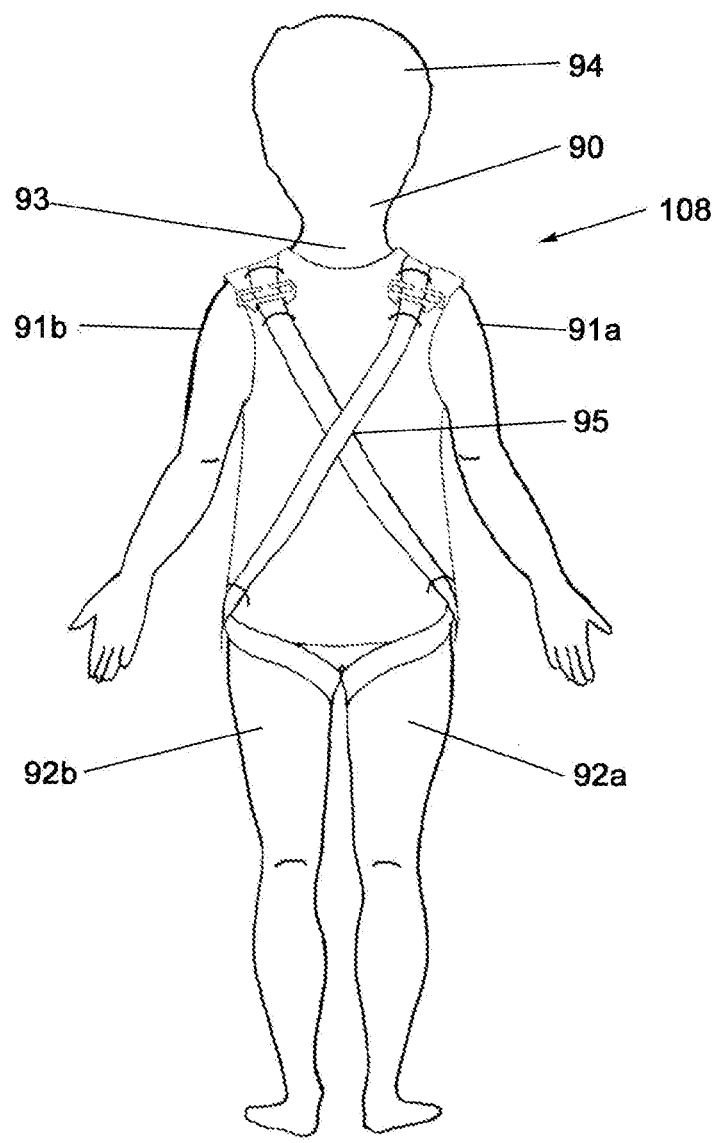
FIG. 12b shows a front view the supplemental restraint harness of FIGS. 11a,b once applied to a wearer i.e. worn by the wearer.

FIGS. 12*a*, 12*b* and 13 illustrate the preferred use of the supplemental restraint harness 108 shown in FIGS. 11*a* and 11*b*, when used with a three-point seat belt 50 which, when buckled, provides a sash belt 50*a* and a lap belt 50*b*. The three-point seat belt 50 configured to restrain a person sitting in a vehicle seat 51. Unlike the use illustrated in FIG. 6*b* in this example the lap belt 50*b* remains in front of the wearer 90 so that the wearer is located between the lap belt 50*b* and the vehicle seat 51. The third connector 20*c* is connected to the lap belt 50*b* and the fourth connector 20*d* is connected to the lap belt 50*b*.

The same steps as described above with respect to FIG. 6*a* are carried out to apply the supplemental restraint harness 108 to the wearer 90 in FIG. 12*a* 12*b*. Once the straps have been adjusted to fit the wearer 90 (as described above for FIG. 6*a*), the wearer sits in the seat.

The seat belt 50 is drawn in front of the wearer and is then buckled so that the wearer is sandwiched between the seat belt and the seat. The seat belt 50 will have a portion which passes diagonally across the torso of the wearer (i.e. the sash belt) and a portion which passes over the lap or waist of the wearer (i.e. the lap belt).

The first or second connector 20*a*,20*b* is connected to the sash belt. In this example the seat belt 50 is configured to cross from right to left of the wearer 90 (from the perspective of the wearer). Accordingly the first connector 20*a*, which in this embodiment is located at the right shoulder of the wearer 90, will be used to connect to the sash belt 50*a*. It should be understood if the seat belt 50 would be configured to cross from left to right of the wearer (from the perspective of the wearer) the second connector 20*b*, which in this embodiment is located at the left shoulder of the wearer 90, will be used to connect to the sash belt 50*a*. In this embodiment preferably the positions of the first and second connectors 20*a*,20*b* is adjusted to the shoulder blade level, so unlike the embodiment described in FIG. 6*b* the connectors 20*a*,20*b* are not moved along their respective straps below the neck line.

The third and fourth connectors 20*c*,*d* (which in this embodiment are located at the lap of the wearer) are connected to the part of the lap belt which passes in front of the wearer (i.e. the part which passes over the lap or waist of the wearer). Advantageously, in this embodiment additional restraining of the wearer is achieved because the lap belt is positioned in front of the wearer.

Advantageously, the restraining forces are more uniformly distributed throughout the torso of the wearer in case of collision when the first and second strap are back crossed, as shown in FIGS. 8 to 13, notably because the first and second strap are each both connected to the third and fourth strap.

Various modifications and variations to the described embodiments of the invention will be apparent to those skilled in the art without departing from the scope of the invention as defined in the appended claims. For example, any of the supplemental restraint harness embodiments described in this application, may further comprise a lap belt or crotch belt.

Although the invention has been described in connection with specific preferred embodiments, it should be understood that the invention as claimed should not be unduly limited to such specific embodiment.

The invention claimed is:

1. A supplemental restraint harness for cooperating with a seat belt of a vehicle, the supplemental restraint harness comprising:
    an upper portion which is configured to be worn on a torso of a wearer, wherein the upper portion comprises a first strap which, when the harness is worn, extends along a front of the wearer's torso, over a first shoulder of the wearer, and along a back of the wearer's torso, and a second strap which, when the harness is worn, extends along the front of the wearer's torso, over a second shoulder of the wearer, and along the back of the wearer's torso; and
    a lower portion, comprising a third strap which can be arranged to form a first loop (4*a*) which can receive a first leg of the wearer, and a fourth strap which can be arranged to form a second loop which can receive a second leg of the wearer;
    and wherein the upper portion and lower portion are connected to one another;
    and wherein the harness comprises at least one connector which is suitable for connecting to the seat belt of the vehicle,
    wherein the harness comprises a first connector provided on the first strap so that the first connector can be connected to a sash belt, and a second connector provided on the second strap so that the second connector can be connected to the sash belt, a third connector provided on the third strap so that the third connector can connect to a lap belt, and a fourth connector provided on the fourth strap so that the fourth connector can connect to the lap belt; and
    wherein one end of the second strap is connected to the third strap at a first connection position, and the opposite end of the second strap is connected to the fourth strap at a third connection position, wherein the third connector is positioned on the third strap, and one end of the first strap is connected to the fourth strap at a fourth connection position, wherein the fourth connector is positioned on the fourth strap, and the opposite end of the first strap is connected to the third strap at a second connection position, so that the first and second straps cross over each other at a crossing point behind the wearer when the harness is worn.

2. The supplemental restraint harness according to claim 1 wherein the first strap and second strap have at least a portion which is elastic.

3. The supplemental restraint harness according to claim 1 wherein the harness further comprises a garment which can be worn on the torso of the wearer, and wherein the harness further comprises an attachment means which attaches the first and second straps to the garment.

4. The supplemental restraint harness according to claim 3 wherein the attachment means comprise one or more guide members which are fixed to the garment and which are configured to receive the first strap, and one or more guide members which are fixed to the garment and which are configured to receive the second strap.

5. The supplemental restraint harness according to claim 4 wherein the one or more guide members comprise a strip which is fixed to the garment to form an arch.

6. The supplemental restraint harness according to claim 1 wherein said at least one connector comprises a hook member which can be arranged to hook onto the seat belt so as to connect the harness to the seat belt.

7. The supplemental restraint harness according to claim 1 wherein said at least one connector comprises a C-shaped portion which defines opposing hook members which can hook onto the seat belt so as to connect the harness to the seat belt.

8. The supplemental restraint harness according to claim 1 wherein said at least one connector comprises an anchor member and a latch member, wherein the latch member comprises a first end which is pivotally attached to the anchor member and the latch member comprises a second, free, end which has a connecting means which can connect with a connecting means on the anchor member;
   wherein the latch member is moveable between a first position wherein the seat belt can be received between the latch member and the anchor member, and a second position wherein the connecting means on the latch member is connected to the connecting means on the anchor member, so that the seat belt is held in a channel defined between the latch member and anchor member.

9. The supplemental restraint harness according to claim 1 wherein said at least one connector has an aperture defined therein through which the first, second, third or fourth strap passes, so as to attach said at least one connector to said strap which passes through the connector.

10. The supplemental restraint harness according to claim 1 wherein the third strap comprises a first free end having a first connector element, and a second free end having a second connector element, and wherein the first and second connector element are configured such that the first and second connector element can be connected to one another, so that the third strap forms said first loop; and
   wherein the fourth strap comprises a first free end having a third connector element, and a second free end having a fourth connector element, and wherein the third and fourth connector elements are configured such that the third and fourth connector elements can be connected to one another, so that the fourth strap forms said second loop.

11. The supplemental restraint harness according to claim 10 wherein the first connector element and/or second connector element comprise(s) a strap adjuster buckle, which can be used to adjust an effective length of the third strap, so that a diameter of the first loop can be adjusted; and wherein the third connector element and/or fourth connector element comprise(s) a strap adjuster buckle, which can be used to adjust an effective length of the fourth strap, so that a diameter of the second loop can be adjusted.

12. The supplemental restraint harness according to claim 1 wherein the first strap further comprises a strap adjuster buckle which can be used to adjust an effective length of the first strap; and
   wherein the second strap further comprises a strap adjuster buckle which can be used to adjust an effective length of the second strap.

13. The supplemental restraint harness according to claim 1 wherein the harness further comprises at least one belt which is connected to both the first and second straps, and wherein the belt is substantially perpendicular to the first and second straps.

14. The supplemental restraint harness according to claim 1 wherein the harness comprises a belt which is connected to the first and second straps at a position such that when the harness is worn the belt is positioned at a sternum of the wearer.

15. The supplemental restraint harness according to claim 1 wherein the harness comprises a belt which is connected to the first and second straps at position such that when the harness is worn the belt is positioned at an upper back of the wearer.

16. The supplemental restraint harness according to claim 1 wherein the harness comprises a belt which is connected to the first and second straps at a position such that when the harness is worn the belt is positioned at a lower back of the wearer.

17. The supplemental restraint harness according to claim 1 wherein the harness comprises a belt which is connected to the first and second straps at a position such that when the harness is worn the belt can be arranged around a waist of the wearer.

18. An assembly comprising a seat belt, wherein the seat belt has been arranged to be buckled, and a harness according to claim 1 wherein the at least one connector is connected to the seat belt.

19. A supplemental restraint harness for cooperating with a seat belt of a vehicle, the supplemental restraint harness comprising:
   an upper portion which is configured to be worn on a torso of a wearer, wherein the upper portion comprises a first strap which, when the harness is worn, extends along a front of the wearer's torso, over a first shoulder of the wearer, and along a back of the wearer's torso, and a second strap which, when the harness is worn, extends along the front of the wearer's torso, over a second shoulder of the wearer, and along the back of the wearer's torso; and
   a lower portion, comprising a third strap which can be arranged to form a first loop (4a) which can receive a first leg of the wearer, and a fourth strap which can be arranged to form a second loop which can receive a second leg of the wearer;
   and wherein the upper portion and lower portion are connected to one another;
   and wherein the harness comprises at least one connector which is suitable for connecting to the seat belt of the vehicle,
   wherein the harness comprises a first connector provided on the first strap so that the first connector can be connected to a sash belt, and a second connector provided on the second strap so that the second connector can be connected to the sash belt, a third connector provided on the third strap so that the third connector can connect to a lap belt, and a fourth connector provided on the fourth strap so that the fourth connector can connect to the lap belt;
   wherein the first strap connects to the third strap at a first connection position and second connection position, and wherein the third connector is positioned between the first and second connection positions, and wherein the second strap connects to the fourth strap at a third connection position and fourth connection position, and wherein the fourth connector is positioned between the third and fourth connection positions.

20. A supplemental restraint harness for cooperating with a seat belt of a vehicle, the supplemental restraint harness comprising:
   an upper portion which is configured to be worn on a torso of a wearer, wherein the upper portion comprises a first strap which, when the harness is worn, extends along a front of the wearer's torso, over a first shoulder of the wearer, and along a back of the wearer's torso, and a second strap which, when the harness is worn, extends along the front of the wearer's torso, over a second shoulder of the wearer, and along the back of the wearer's torso; and
   a lower portion, comprising a third strap which can be arranged to form a first loop (4a) which can receive a first leg of the wearer, and a fourth strap which can be arranged to form a second loop which can receive a second leg of the wearer;

and wherein the upper portion and lower portion are connected to one another;

and wherein the harness comprises at least one connector which is suitable for connecting to the seat belt of the vehicle, wherein the harness comprises a first connector provided on the first strap so that the first connector can be connected to a sash belt, and a second connector provided on the second strap so that the second connector can be connected to the sash belt, a third connector provided on the third strap so that the third connector can connect to a lap belt, and a fourth connector provided on the fourth strap so that the fourth connector can connect to the lap belt; and wherein one end of the second strap is connected to the third strap at a first connection position, and the opposite end of the second strap is connected to the fourth strap at a third connection position, wherein the third connector is positioned substantially opposite the first connection position, and one end of the first strap is connected to the fourth strap at a fourth connection position, wherein the fourth connector is positioned substantially opposite the fourth connection position, and the opposite end of the first strap is connected to the third strap at a second connection position, so that the first and second straps cross over each other at a crossing point behind the wearer when the harness is worn.

\* \* \* \* \*